United States Patent
Byun et al.

(10) Patent No.: US 11,262,481 B2
(45) Date of Patent: *Mar. 1, 2022

(54) ANTI-REFLECTIVE FILM

(71) Applicant: LG CHEM, LTD., Seoul (KR)

(72) Inventors: Jin Seok Byun, Daejeon (KR); Jeong Kyu Lee, Daejeon (KR); Boo Kyung Kim, Daejeon (KR); Seok Hoon Jang, Daejeon (KR); Yeong Rae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,227

(22) Filed: Mar. 11, 2020

(65) Prior Publication Data

US 2020/0278478 A1    Sep. 3, 2020

Related U.S. Application Data

(63) Continuation of application No. 15/750,330, filed as application No. PCT/KR2017/002583 on Mar. 9, 2017, now Pat. No. 10,627,547.

(30) Foreign Application Priority Data

Mar. 9, 2016  (KR) ........................ 10-2016-0028468
Mar. 11, 2016 (KR) ........................ 10-2016-0029336
(Continued)

(51) Int. Cl.
*G02B 1/11*     (2015.01)
*B32B 7/02*     (2019.01)
(Continued)

(52) U.S. Cl.
CPC .............. *G02B 1/11* (2013.01); *B05D 3/0254* (2013.01); *B05D 3/067* (2013.01); *B32B 7/02* (2013.01);
(Continued)

(58) Field of Classification Search
CPC . G02B 1/11; C08J 7/042; B32B 27/08; B32B 27/18; C08K 7/18
See application file for complete search history.

(56) References Cited

U.S. PATENT DOCUMENTS 5,740,226 A    4/1998  Komiya et al.
6,633,392 B1   10/2003 Singh et al.
(Continued)

FOREIGN PATENT DOCUMENTS

CN    1387052 A    12/2002
CN    101285898 A  10/2008
(Continued)

OTHER PUBLICATIONS

Polymer Molecular Weight Distribution and Definitions of MW Averages, Agilent Technologies, (Apr. 2015), pp. 1-4.
(Continued)

*Primary Examiner* — Hai Vo
(74) *Attorney, Agent, or Firm* — Rothwell, Figg, Ernst & Manbeck, P.C.

(57) ABSTRACT

The present invention relates to an anti-reflective film exhibiting one or more peaks ($q_{max}$) at a scattering vector of 0.0758 to 0.1256 $nm^{-1}$, in a graph showing a log value of scattering intensity to a scattering vector defined in small-angle X-ray scattering.

16 Claims, 18 Drawing Sheets

(30) Foreign Application Priority Data

Mar. 14, 2016 (KR) ........................ 10-2016-0030395
Mar. 9, 2017 (KR) ........................ 10-2017-0029959

(51) Int. Cl.

| | | |
|---|---|---|
| B32B 27/08 | (2006.01) | |
| B32B 27/18 | (2006.01) | |
| C09D 5/00 | (2006.01) | |
| C08L 33/10 | (2006.01) | |
| G02B 1/113 | (2015.01) | |
| G02B 5/18 | (2006.01) | |
| C08C 19/40 | (2006.01) | |
| C09D 4/06 | (2006.01) | |
| C08L 83/04 | (2006.01) | |
| G01N 23/207 | (2018.01) | |
| C09D 5/33 | (2006.01) | |
| B32B 7/023 | (2019.01) | |
| G02B 1/14 | (2015.01) | |
| C09D 7/40 | (2018.01) | |
| B05D 3/02 | (2006.01) | |
| B05D 3/06 | (2006.01) | |
| C09D 135/02 | (2006.01) | |
| G02B 1/115 | (2015.01) | |
| C08J 7/04 | (2020.01) | |
| C09D 4/00 | (2006.01) | |
| C08L 27/12 | (2006.01) | |
| G02B 1/12 | (2006.01) | |
| C08K 7/18 | (2006.01) | |
| C09D 7/61 | (2018.01) | |
| C08K 3/01 | (2018.01) | |
| B05D 1/28 | (2006.01) | |
| C08K 3/36 | (2006.01) | |
| C08K 7/26 | (2006.01) | |

(52) U.S. Cl.
CPC ............. *B32B 7/023* (2019.01); *B32B 27/08* (2013.01); *B32B 27/18* (2013.01); *C08C 19/40* (2013.01); *C08J 7/042* (2013.01); *C08L 27/12* (2013.01); *C08L 33/10* (2013.01); *C08L 83/04* (2013.01); *C09D 4/00* (2013.01); *C09D 4/06* (2013.01); *C09D 5/00* (2013.01); *C09D 5/004* (2013.01); *C09D 5/006* (2013.01); *C09D 7/67* (2018.01); *C09D 135/02* (2013.01); *G01N 23/207* (2013.01); *G02B 1/113* (2013.01); *G02B 1/115* (2013.01); *G02B 1/12* (2013.01); *G02B 1/14* (2015.01); *G02B 5/18* (2013.01); *B05D 1/28* (2013.01); *B32B 2264/102* (2013.01); *B32B 2264/12* (2013.01); *C08J 2301/02* (2013.01); *C08J 2435/02* (2013.01); *C08K 3/01* (2018.01); *C08K 3/36* (2013.01); *C08K 7/18* (2013.01); *C08K 7/26* (2013.01); *C08K 2201/011* (2013.01); *C08L 2203/16* (2013.01); *C09D 7/61* (2018.01)

(56) References Cited

U.S. PATENT DOCUMENTS

| | | | |
|---|---|---|---|
| 6,780,547 | B2 | 8/2004 | Motonaga et al. |
| 6,844,976 | B1 | 1/2005 | Firon et al. |
| 7,335,698 | B2 | 2/2008 | Mano et al. |
| 7,629,051 | B2 | 12/2009 | Fukushige et al. |
| 7,964,685 | B2 | 6/2011 | Yoshiwara et al. |
| 8,343,622 | B2 | 1/2013 | Liu et al. |
| 8,512,801 | B2 | 8/2013 | Yoshihara et al. |
| 8,691,351 | B2 | 4/2014 | Asakura et al. |
| 8,795,825 | B2 | 8/2014 | Kim et al. |
| 9,310,525 | B2 | 4/2016 | Shibuya et al. |
| 9,658,467 | B2 | 5/2017 | Hervieu et al. |
| 9,951,229 | B2 | 4/2018 | Cho et al. |
| 10,222,510 | B2 | 3/2019 | Song et al. |
| 10,234,599 | B2 | 3/2019 | Byun et al. |
| 10,627,547 | B2 * | 4/2020 | Byun ................. G02B 1/115 |
| 10,627,548 | B2 * | 4/2020 | Byun ................. C08J 7/042 |
| 10,663,623 | B2 * | 5/2020 | Byun ................. G02B 1/11 |
| 10,768,342 | B2 * | 9/2020 | Kim ................... C09D 7/70 |
| 10,802,178 | B2 * | 10/2020 | Song .................. C08L 83/04 |
| 10,895,657 | B2 * | 1/2021 | Dorrough .......... G01V 3/088 |
| 10,895,667 | B2 | 1/2021 | Byun et al. |
| 10,983,252 | B2 * | 4/2021 | Song ................... B05D 3/0254 |
| 2002/0187324 | A1 | 12/2002 | Shoshi et al. |
| 2004/0044127 | A1 | 3/2004 | Okubo et al. |
| 2005/0038187 | A1 | 2/2005 | Mano et al. |
| 2005/0200278 | A1 | 9/2005 | Jones et al. |
| 2005/0227055 | A1 | 10/2005 | Senkevich et al. |
| 2006/0007430 | A1 | 1/2006 | Lotz et al. |
| 2006/0274423 | A1 | 12/2006 | Fukushige et al. |
| 2007/0291367 | A1 | 12/2007 | Hamamoto et al. |
| 2008/0032053 | A1 | 2/2008 | Kourtakis et al. |
| 2009/0176084 | A1 | 7/2009 | Yoshihara et al. |
| 2009/0246415 | A1 | 10/2009 | Horie et al. |
| 2010/0021694 | A1 | 1/2010 | Wakizaka et al. |
| 2010/0039708 | A1 | 2/2010 | Suzuki et al. |
| 2010/0196687 | A1 | 8/2010 | Isono et al. |
| 2010/0311868 | A1 | 12/2010 | Bekiarian et al. |
| 2012/0200933 | A1 * | 8/2012 | Akiyama ........... G02B 5/0242 359/601 |
| 2013/0071646 | A1 | 3/2013 | Kim et al. |
| 2013/0088779 | A1 | 4/2013 | Kang et al. |
| 2013/0089178 | A1 | 4/2013 | Mazor et al. |
| 2013/0135726 | A1 | 5/2013 | Wakizaka et al. |
| 2013/0143028 | A1 | 6/2013 | Asahi et al. |
| 2013/0215514 | A1 | 8/2013 | Kim et al. |
| 2013/0216818 | A1 | 8/2013 | Kim et al. |
| 2013/0265529 | A1 | 10/2013 | Wakizaka et al. |
| 2013/0329297 | A1 | 12/2013 | Hayashi et al. |
| 2014/0016204 | A1 | 1/2014 | Hakuta et al. |
| 2014/0037741 | A1 | 2/2014 | Armes et al. |
| 2014/0079937 | A1 | 3/2014 | Jung et al. |
| 2014/0340755 | A1 | 11/2014 | Eguchi et al. |
| 2015/0079348 | A1 | 3/2015 | Mizoshita et al. |
| 2015/0152279 | A1 | 6/2015 | Kai et al. |
| 2015/0274983 | A1 | 10/2015 | Cho et al. |
| 2015/0276989 | A1 | 10/2015 | Han et al. |
| 2016/0304722 | A1 | 10/2016 | Kobori |
| 2018/0106929 | A1 | 4/2018 | Song et al. |
| 2018/0231688 | A1 | 8/2018 | Byun et al. |
| 2020/0278478 | A1 | 9/2020 | Byun et al. |
| 2020/0278479 | A1 * | 9/2020 | Byun .................. B05D 3/0254 |

FOREIGN PATENT DOCUMENTS

| | | |
|---|---|---|
| CN | 101288004 A | 10/2008 |
| CN | 101765791 A | 6/2010 |
| CN | 101855303 A | 10/2010 |
| CN | 102119344 A | 7/2011 |
| CN | 102576095 A | 7/2012 |
| CN | 102736138 A | 10/2012 |
| CN | 102933663 A | 2/2013 |
| CN | 103091733 A | 5/2013 |
| CN | 103364845 A | 10/2013 |
| CN | 103460079 A | 12/2013 |
| CN | 103782203 A | 5/2014 |
| CN | 104066778 A | 9/2014 |
| CN | 104458589 A | 3/2015 |
| CN | 107635765 B | 12/2018 |
| CN | 108027452 A | 5/2020 |
| EP | 3248776 A1 | 11/2017 |
| EP | 3385070 A1 | 10/2018 |
| JP | 2000-035408 A | 2/2000 |
| JP | 2001-290257 A | 10/2001 |
| JP | 2003-515196 A | 4/2003 |
| JP | 2003142476 A | 5/2003 |
| JP | 2003-322627 A | 11/2003 |
| JP | 2004212791 A | 7/2004 |
| JP | 2004255635 A | 9/2004 |
| JP | 2004-314599 A | 11/2004 |

(56) References Cited

FOREIGN PATENT DOCUMENTS

| | | | |
|---|---|---|---|
| JP | 2005-062350 A | 3/2005 |
| JP | 2005-213366 A | 8/2005 |
| JP | 2005234003 A | 9/2005 |
| JP | 2006-079067 A | 3/2006 |
| JP | 2007-011309 A | 1/2007 |
| JP | 2007078711 A | 3/2007 |
| JP | 2007098833 A | 4/2007 |
| JP | 2007-272132 A | 10/2007 |
| JP | 2007272131 A | 10/2007 |
| JP | 2008-111964 A | 5/2008 |
| JP | 2008107792 A | 5/2008 |
| JP | 2008-137190 A | 6/2008 |
| JP | 2009-053691 A | 3/2009 |
| JP | 2009163260 A | 7/2009 |
| JP | 2009-204698 A | 9/2009 |
| JP | 2009217258 A | 9/2009 |
| JP | 2009-244382 A | 10/2009 |
| JP | 2009-545651 A | 12/2009 |
| JP | 2010-085983 A | 4/2010 |
| JP | 2010084017 A | 4/2010 |
| JP | 2010085579 A | 4/2010 |
| JP | 2011-505465 A | 2/2011 |
| JP | 2011-081120 A | 4/2011 |
| JP | 2011-088787 A | 5/2011 |
| JP | 2011-102977 A | 5/2011 |
| JP | 2011-178062 A | 9/2011 |
| JP | 2011-255527 A | 12/2011 |
| JP | 2011248036 A | 12/2011 |
| JP | 2012-036479 A | 2/2012 |
| JP | 2012-063687 A | 3/2012 |
| JP | 2012-159744 A | 8/2012 |
| JP | 2012-198330 A | 10/2012 |
| JP | 2012-247606 A | 12/2012 |
| JP | 2013-000639 A | 1/2013 |
| JP | 2013-008025 A | 1/2013 |
| JP | 2013-104959 A | 5/2013 |
| JP | 2013-130865 A | 7/2013 |
| JP | 2013-178534 A | 9/2013 |
| JP | 2013205645 A | 10/2013 |
| JP | 2013-228741 A | 11/2013 |
| JP | 2013-254118 A | 12/2013 |
| JP | 2014-016607 A | 1/2014 |
| JP | 2014-041249 A | 3/2014 |
| JP | 5450708 B2 | 3/2014 |
| JP | 2014-059368 A | 4/2014 |
| JP | 2014-067829 A | 4/2014 |
| JP | 2014-074779 A | 4/2014 |
| JP | 2014-529762 A | 11/2014 |
| JP | 2014-240929 A | 12/2014 |
| JP | 2015-028874 A | 2/2015 |
| JP | 2015072464 A | 4/2015 |
| JP | 10-2015-0065576 A | 6/2015 |
| JP | 2015-108733 A | 6/2015 |
| JP | 2015-122060 A | 7/2015 |
| JP | 2015-143700 A | 8/2015 |
| JP | 2015-155373 A | 8/2015 |
| JP | 10-2015-0145895 A | 12/2015 |
| JP | 2015-232614 A | 12/2015 |
| JP | 2015-536477 A | 12/2015 |
| JP | 2016-509250 A | 3/2016 |
| JP | 2017-021293 A | 1/2017 |
| JP | 2017-040936 A | 2/2017 |
| JP | 2017-049313 A | 3/2017 |
| JP | 2018-123043 A | 8/2018 |
| JP | 2018-530770 A | 10/2018 |
| JP | 2018-533762 A | 11/2018 |
| JP | 6476347 B1 | 2/2019 |
| JP | 2019-070858 A | 5/2019 |
| KR | 20060046318 A | 5/2005 |
| KR | 20080050335 A | 6/2008 |
| KR | 20090046873 A | 5/2009 |
| KR | 20090105545 A | 10/2009 |
| KR | 20100039869 A | 4/2010 |
| KR | 100960442 B1 | 5/2010 |
| KR | 20110060810 A | 6/2011 |
| KR | 20110121233 A | 11/2011 |
| KR | 20120093212 A | 8/2012 |
| KR | 101194180 B1 | 10/2012 |
| KR | 10-1226228 B1 | 1/2013 |
| KR | 20130120223 A | 11/2013 |
| KR | 20140006876 A | 1/2014 |
| KR | 20140006922 A | 1/2014 |
| KR | 101378603 B1 | 3/2014 |
| KR | 20140037080 A | 3/2014 |
| KR | 20140050538 A | 4/2014 |
| KR | 10-2015-0120264 A | 10/2015 |
| TW | 200807014 A | 2/2008 |
| TW | 200833763 A | 8/2008 |
| TW | 201011356 A | 3/2010 |
| TW | 201128215 A | 8/2011 |
| TW | 201221599 A | 6/2012 |
| TW | 201606357 A | 2/2016 |
| WO | 2005-085913 A1 | 9/2005 |
| WO | 2008-081885 A1 | 7/2008 |
| WO | 2009120983 A2 | 10/2009 |
| WO | 2012-147527 A1 | 11/2012 |
| WO | 2012-157682 A1 | 11/2012 |
| WO | 2013/099931 A1 | 7/2013 |
| WO | 2017-157682 A | 9/2017 |
| WO | 2017-157682 A1 | 9/2017 |

OTHER PUBLICATIONS

37 CFR 1.132 Declaration cited in U.S. Appl. No. 16/239,376. Retrieved Feb. 29, 2020 and cited in Office Action dated Mar. 5, 2020 in U.S. Appl. No. 16/239,376 (5 pages).
Office Action dated Mar. 5, 2020 in U.S. Appl. No. 16/239,376 (12 pages).
Opalinska, et al.; "Size-dependent density of zirconia nanoparticles;" Beilstein Journal of Nanotechnology; 6; (2015); pp. 27-35.
Kimoto, et al.; "Effective Density of Silica Nanoparticle Size Standards;" International Aerosol Conference; (2014); p. 1.
Extended European Search Report issued for European Patent Application No. 17 76 3596 dated Nov. 29, 2018, 9 pages.
Amemiya, et al., "Principle of Small-Angle X-ray Scattering and a Perspective", (2006) The Japanese Society for Synchrotron Radiation Research, vol. 19, No. 6, 11 pages, (with English Absliact).
"ORGANOSILICASOL", Nissan Chemical Corporation, retrieved from: https://www.nissanchem.co.jp/products/materials/inorganic/products/02/ on Jul. 1, 2019, 6 pages.
"Nanomaterial information providing sheet—Amorphous colloidal silica", Ministry of Economy, Trade and Industry, Jul. 2015, retrieved from: http://warp.da.ndl.go.jp/info:ndljp/pid/10977616/www.meti.go.jp/policy/chemical_management/files/nanomaterial/150626SiO3.pdf, 19 pages.
"Nanomaterial information providing sheet—Silica manufactured by a dry method called as flame hydrolysis method or combustion hydrolysis method", Ministry of Economy, Trade and Industry, Jul. 2015, retrieved from: http://warp.da.ndl.go.jp/info:ndljp/pid/10977616/www.meti.go.jp/policy/chemical_management/files/nanomaterial/150626SiO2.pdf, 10 pages.
Extended European Search Report issued in European patent application No. 17763598.4 dated Aug. 1, 2018, 8 pages.
Extended European Search Report issued in European patent application No. 17733956.1 dated Sep. 3, 2018, 6 pages.

* cited by examiner

ANTI-REFLECTIVE FILM

CROSS-REFERENCE TO RELATED APPLICATION

This application is a continuation application of U.S. patent application Ser. No. 15/750,330, filed on Feb. 5, 2018, which is a 35 U.S.C. 371 National Phase Entry Application from PCT/KR2017/002583 filed on Mar. 9, 2017, which claims the benefit of Korean Patent Application No. 10-2016-0028468 filed on Mar. 9, 2016, Korean Patent Application No. 10-2016-0029336 filed on Mar. 11, 2016, Korean Patent Application No. 10-2016-0030395 filed on Mar. 14, 2016, and Korean Patent Application No. 10-2017-0029959 filed on Mar. 9, 2017 with the Korean Intellectual Property Office, the disclosures of which are incorporated herein by reference in their entirety.

FIELD OF THE INVENTION

The present invention relates to an anti-reflective film, and more specifically, to an anti-reflective film that has low reflectance and high light transmittance, and can simultaneously realize high scratch resistance and an anti-pollution property, and can increase screen sharpness of a display device.

BACKGROUND OF THE INVENTION

In general, flat panel display devices such as a PDP, an LCD, etc., are equipped with an anti-reflective film so as to minimize reflection of incident light from the outside.

Methods for minimizing the reflection of light include a method of dispersing a filler such as inorganic fine particles, etc. in a resin, coating it on a substrate film, and imparting unevenness (anti-glare: AG coating) thereto, a method of using light interference by forming multiple layers having different refractive indexes on a substrate film (anti-reflective; AR coating), a method of using them together, etc.

Among them, in the case of the AG coating, although the absolute amount of reflected light is equivalent to common hard coatings, a low reflection effect can be obtained by reducing the amount of light entering the eyes using light scattering through unevenness. However, since the AG coating lowers screen sharpness due to the surface unevenness, recently, many studies on the AR coating are progressing.

As a film using the AR coating, those having a multi-layered structure in which a hard coating layer (high refractive index layer), a low reflective coating layer, etc. are stacked on a substrate film are being commercialized. However, since the method of forming multiple layers separately conducts the processes of forming each layer, it has a disadvantage in terms of lowered scratch resistance due to weak interlayer adhesion (interface adhesion).

Previously, in order to improve scratch resistance of the low refractive layer included in the anti-reflective film, a method of adding various particles of a nanometer size (for example, silica, alumina, zeolite, etc.) was mainly attempted. However, when using nanometer-sized particles, it was difficult to simultaneously increase scratch resistance while lowering the reflectance of the low refractive layer, and due to the nanometer-sized particles, the anti-pollution property of the surface of the low refractive layer was significantly deteriorated.

Accordingly, in order to reduce the absolute reflection amount of incident light from the outside and improve the anti-pollution property as well as scratch resistance of the surface, many studies are being progressed, but the resulting property improvement degree is unsatisfactory.

DETAILED DESCRIPTION OF THE INVENTION

Technical Problem

It is an object of the present invention to provide an anti-reflective film that has low reflectance and high light transmittance, that can simultaneously realize high scratch resistance and an anti-pollution property, and can increase screen sharpness of a display device.

Technical Solution

An anti-reflective film exhibiting one or more peaks ($q_{max}$) at a scattering vector of 0.0758 to 0.1256 $nm^{-1}$, in a graph showing the log value of scattering intensity to a scattering vector defined in small-angle X-ray scattering, is provided herein.

Hereinafter, an anti-reflective film according to specific embodiments of the invention will be explained in detail.

As used herein, a photopolymerizable compound commonly designates a compound that causes a polymerization reaction if light, for example, visible rays or ultraviolet rays, is irradiated thereto.

A fluorine-containing compound means a compound including at least one fluorine atom in the compound.

Further, (meth)acryl includes both acryl and methacryl.

In addition, (co)polymer includes both copolymer and homopolymer.

Also, silica hollow particles mean silica particles derived from a silicon compound or an organosilicon compound, wherein an empty space exists on the surface and/or inside of the silica particles.

According to one embodiment of the present invention, an anti-reflective film exhibiting one or more peaks ($q_{max}$) at a scattering vector of 0.0758 to 0.1256 $nm^{-1}$, in a graph showing a log value of scattering intensity to a scattering vector defined in small-angle X-ray scattering, is provided.

The present inventors progressed studies on an anti-reflective film, confirmed through experiments that an anti-reflective film fulfilling the requirement of exhibiting one or more peaks ($q_{max}$) at a scattering vector of 0.0758 to 0.1256 $nm^{-1}$, in a graph showing the log value of scattering intensity to a scattering vector defined in small-angle X-ray scattering, has low reflectance and high light transmittance, and can simultaneously realize high scratch resistance and an anti-pollution property, and completed the present invention.

Specifically, whether or not an anti-reflective film may exhibit one or more peaks ($q_{max}$) of the log value of scattering intensity at a scattering vector of 0.0758 to 0.1256 $nm^{-1}$, in a graph showing the log value of scattering intensity to a scattering vector defined in small-angle X-ray scattering, may be related to the internal structure of the anti-reflective film, for example, the average distance between the organic or inorganic particles included in the anti-reflective film. An anti-reflective film fulfilling the requirement of exhibiting one or more peaks ($q_{max}$) at a scattering vector of 0.0758 to 0.1256 $nm^{-1}$, 0.0800 to 0.1240 $nm^{-1}$ or 0.1000 to 0.1230 $nm^{-1}$, in a graph showing the log value of scattering intensity to a scattering vector defined in small-angle X-ray scattering, can maintain an optimized refractive index value, and thus, can realize low reflectance.

For example, if an anti-reflective film exhibits a peak at a scattering vector of less than 0.0758 nm$^{-1}$ in a graph showing the log value of scattering intensity to a scattering vector defined in small-angle X-ray scattering, the refractive index of the anti-reflective film may increase because of the excessive distance between the organic or inorganic particles included in the anti-reflective film, etc., and thus the reflectance may also largely increase.

Meanwhile, if a peak first appears in a scattering vector of greater than 0.1256 nm$^{-1}$ in a graph showing the log value of scattering intensity to a scattering vector defined in small-angle X-ray scattering, the distance between the organic or inorganic particles included in the anti-reflective film may become too small, and thus the illumination of the anti-reflective film may increase and the scratch resistance and anti-pollution property may be deteriorated.

The peak is an extreme value at which the log value of scattering intensity appears upwardly convex, in a graph showing the log value of scattering intensity to a scattering vector defined in small-angle X-ray scattering. Such an extreme value or inflection point may be a point at which scattering is maximized by the arrangement of the organic or inorganic particles included in the anti-reflective film.

As explained above, the anti-reflective film of the embodiment may exhibit one or more peaks ($q_{max}$) at a scattering vector of 0.0758 to 0.1256 nm$^{-1}$, in a graph showing the log value of scattering intensity to a scattering vector defined in small-angle X-ray scattering. More specifically, the range of the scattering vector of 0.0758 to 0.1256 nm$^{-1}$, in a graph showing the log value of scattering intensity to a scattering vector defined in the small-angle X-ray scattering of the anti-reflective film of the embodiment, may be a point at which a peak of the log value of scattering intensity to the scattering vector first appears.

The scattering vector defined in small-angle X-ray scattering is defined by the following Equation 1.

$$q = 4\pi \sin \theta / \lambda \qquad \text{[Equation 1]}$$

In Equation 1, q is a scattering vector, $\theta$ is a ½ value of a scattering angle, and $\lambda$ is a wavelength of irradiated X-rays.

Specifically, the small-angle X-ray scattering means a transmission mode or grazing incidence small-angle X-ray scattering, and for example, may be measured by irradiating X-rays of a wavelength of 0.63 Å to 1.54 Å to an anti-reflective film with a size of 1 cm$^{-1}$ cm (width*length) at a distance of 4 m.

For example, small angle X-ray scattering (SAXS) may be achieved by transmitting X-rays through a sample at the 4 C beam line of a Pohang Accelerator and measuring scattering intensity according to the scattering vector (q). More specifically, the small angle scattering measurement may be conducted by placing a sample at a location about 4 m away from a detector and sending X-rays thereto, wherein X-rays having a vertical size of 0.023 mm and a horizontal size of 0.3 mm may be used, and as the detector, a 2D mar CCD may be used. Further, the scattered 2D diffraction pattern is obtained as an image, and through calibration using a sample-to-detector distance obtained through a standard sample, and a circular average, scattering intensity according to the scattering vector (q) may be converted.

Meanwhile, the requirement of exhibiting one or more peaks ($q_{max}$) at a scattering vector of 0.0758 to 0.1256 nm$^{-1}$, in a graph showing the log value of scattering intensity to a scattering vector defined in small-angle X-ray scattering, may be achieved by controlling the properties of the anti-reflective film such as the components included in the anti-reflective film, optical properties, surface properties, internal properties, etc.

For example, the anti-reflective film may include a hard coating layer, and a low refractive layer including a binder resin and hollow inorganic nanoparticles and solid inorganic nanoparticles dispersed in the binder resin.

Specifically, in the anti-reflective film, near the interface between the hard coating layer and the low refractive layer, the solid inorganic nanoparticles may be more distributed than the hollow inorganic nanoparticles.

Previously, in order to increase scratch resistance of an anti-reflective film, inorganic particles were added in an excess amount, which had a limit in increasing scratch resistance of an anti-reflective film, and had a problem of deterioration of reflectance and anti-pollution properties.

To the contrary, when hollow inorganic nanoparticles and solid inorganic nanoparticles are distributed so as to be distinguished from each other in the low refractive layer included in the anti-reflective film, high scratch resistance and an anti-pollution property can be simultaneously realized while having low reflectance and high light transmittance.

Specifically, when solid inorganic nanoparticles are mainly distributed near the interface between the hard coating layer and the low refractive layer and hollow inorganic nanoparticles are mainly distributed to the opposite side in the low refractive layer of the anti-reflective film, lower reflectance compared to the reflectance that could be previously obtained using inorganic particles can be achieved, and the low refractive layer can simultaneously realize significantly improved scratch resistance and anti-pollution properties.

As explained above, by fulfilling the requirement of exhibiting one or more peaks ($q_{max}$) at a scattering vector of 0.0758 to 0.1256 nm$^{-1}$ in a graph showing the log value of scattering intensity to a scattering vector defined at small-angle X-ray scattering, the anti-reflective film has low reflectance and high light transmittance, and can simultaneously realize high scratch resistance and anti-pollution properties.

As explained above, the low refractive layer includes the binder resin and hollow inorganic nanoparticles and solid inorganic nanoparticles dispersed in the binder resin, and may be formed on one side of the hard coating layer, wherein 70 vol % or more of the total solid inorganic nanoparticles may exist within 50% of the total thickness of the low refractive layer from the interface between the hard coating layer and the low refractive layer.

The description that 70 vol % or more of the total solid inorganic nanoparticles exist in a specific region means that in the cross-section of the low refractive layer, most of the solid inorganic nanoparticles exist in the specific region, and specifically, 70 vol % or more of the total solid inorganic nanoparticles can be confirmed by measuring the volume of the total solid inorganic nanoparticles.

Whether or not the hollow inorganic nanoparticles and the solid inorganic nanoparticles are present in specific regions may be determined by whether each of the hollow inorganic nanoparticles or each of the solid inorganic nanoparticles is present in the specific region, except for particles present on an interface of the specific region.

Further, as explained above, in the low refractive layer, hollow inorganic nanoparticles may be mainly distributed to the opposite side of the interface between the hard coating layer and the low refractive layer, and specifically, 30 vol % or more, 50 vol % or more, or 70 vol % or more of the total hollow inorganic nanoparticles may exist farther than the total solid inorganic nanoparticles, in the thickness direction of the low refractive layer from the interface between the hard coating layer and the low refractive layer.

More specifically, 70 vol % or more of the total solid inorganic nanoparticles may exist within 30% of the total thickness of the low refractive layer from the interface between the hard coating layer and the low refractive layer. In addition, 70 vol % or more of the total hollow inorganic nanoparticles may exist in a region exceeding 30% of the total thickness of the low refractive layer from the interface between the hard coating layer and the low refractive layer.

By mainly distributing solid inorganic nanoparticles near the interface between the hard coating layer and the low refractive layer and mainly distributing hollow inorganic nanoparticles to the opposite side of the interface in the low refractive layer of the anti-reflective film, 2 or more parts or 2 or more layers having different refractive indexes may be formed in the low refractive layer, and thus the reflectance of the anti-reflective film may be lowered.

The specific distribution of the solid inorganic nanoparticles and hollow inorganic nanoparticles in the low refractive layer may be obtained by controlling the density difference between the solid inorganic nanoparticles and the hollow inorganic nanoparticles and controlling the drying temperature of a photocurable resin composition for forming a low refractive layer including the two kinds of nanoparticles, in the preparation method described below.

Specifically, the solid inorganic nanoparticles may have 0.50 g/cm$^3$ or more higher density than the hollow inorganic nanoparticles, and the density difference between the solid inorganic nanoparticles and the hollow inorganic nanoparticles may be 0.50 g/cm$^3$ to 1.50 g/cm$^3$, or 0.60 g/cm$^3$ to 1.00 g/cm$^3$. Due to such a density difference, in the low refractive layer formed on the hard coating layer, the solid inorganic nanoparticles may be positioned nearer to the hard coating layer. However, as confirmed in the preparation method and examples, etc. described below, despite the density difference between the two kinds of particles, predetermined drying temperature and time should be applied so as to realize the above-explained distribution aspect of particles in the low refractive layer.

In case the solid inorganic nanoparticles are mainly distributed near the interface between the hard coating layer and the low refractive layer and the hollow inorganic nanoparticles are mainly distributed to the opposite side of the interface in the low refractive layer of the anti-reflective film, lower reflectance than the reflectance previously obtained using inorganic particles can be realized. Specifically, the anti-reflective film may exhibit mean reflectance of 1.5% or less, 0.7% or less, 0.50 to 0.7%, 0.60% to 0.70%, or 0.62% to 0.67% in the visible light wavelength region of 380 nm to 780 nm.

Meanwhile, in the anti-reflective film of the embodiment, the low refractive layer may include a first layer including 70 vol % or more of the total solid inorganic nanoparticles and a second layer including 70 vol % or more of the total hollow inorganic nanoparticles, and the first layer may be positioned nearer to the interface between the hard coating layer and the low refractive layer than the second layer.

As explained above, in the low refractive layer of the anti-reflective film, solid inorganic nanoparticles are mainly distributed near the interface between the hard coating layer and the low refractive layer and hollow inorganic nanoparticles are mainly distributed to the opposite side of the interface, and the regions where the solid inorganic nanoparticles and the hollow inorganic nanoparticles are respectively mainly distributed may form separate layers that are visibly confirmed in the low refractive layer.

Further, the first layer including 70 vol % or more of the total solid inorganic nanoparticles may be positioned within 50% of the total thickness of the low refractive layer from the interface between the hard coating layer and the low refractive layer. More specifically, the first layer including 70 vol % or more of the total solid inorganic nanoparticles may exist within 30% of the total thickness of the low refractive layer from the interface between the hard coating layer and the low refractive layer.

As explained above, in the low refractive layer, the hollow inorganic nanoparticles may be mainly distributed to the opposite side of the interface between the hard coating layer and the low refractive layer, and specifically, 30 vol % or more, 50 vol % or more, or 70 vol % or more of the hollow inorganic nanoparticles may exist farther than the solid inorganic nanoparticles, in the thickness direction of the low refractive layer from the interface between the hard coating layer and the low refractive layer. Thus, as explained above, the first layer may be positioned nearer to the interface between the hard coating layer and the low refractive layer, than the second layer.

As explained above, it can be visibly confirmed that the first layer and the second layer where the solid inorganic nanoparticles and the hollow inorganic nanoparticles are mainly distributed, respectively, exist in the low refractive layer. For example, it can be visibly confirmed using a transmission electron microscope, a scanning electron microscope, etc. that the first layer and the second layer respectively exist in the low refractive layer, and the ratio of the solid inorganic nanoparticles and the hollow inorganic nanoparticles that are distributed in the first layer and the second layer, respectively, in the low refractive layer can also be confirmed.

Meanwhile, each of the first layer including 70 vol % or more of the total solid inorganic nanoparticles and the second layer including 70 vol % or more of the total hollow inorganic nanoparticles may share common optical properties in one layer, and thus can be defined as one layer.

More specifically, the first layer and the second layer respectively have specific Cauchy parameters A, B, and C, when fitting the polarization ellipticity measured by ellipsometry to a Cauchy model of the following Equation 1, and thus the first layer and the second layer may be distinguished from each other. Further, since the thicknesses of the first layer and the second layer may be derived through the fitting of the polarization ellipticity measured by ellipsometry to a Cauchy model of the following Equation 1, the first layer and the second layer can be defined in the low refractive layer.

$$n(\lambda) = A + \frac{B}{\lambda^2} + \frac{C}{\lambda^4} \qquad \text{[Equation 1]}$$

In Equation 1, n(λ) is a refractive index at a λ wavelength, λ is the range of 300 nm to 1800 nm, and A, B, and C are Cauchy parameters.

Meanwhile, the Cauchy parameters A, B, and C derived when fitting the polarization ellipticity measured by ellipsometry to a Cauchy model of Equation 1 may be the mean values in one layer. Thus, in case an interface exists between the first layer and the second layer, a region where the Cauchy parameters A, B, and C of the first layer and the second layer overlap may exist. However, even in this case, the thicknesses and the locations of the first layer and the second layer may be specified according to the regions satisfying the mean values of Cauchy parameters A, B, and C of the first layer and the second layer.

For example, for the first layer included in the low refractive layer, when fitting the polarization ellipticity measured by ellipsometry to a Cauchy model of Equation 1, the requirements that A is 1.0 to 1.65, B is 0.0010 to 0.0350, and C is 0 to $1*10^{-3}$ can be fulfilled, and for the first layer included in the low refractive layer, the requirements that A is 1.30 to 1.55, 1.40 to 1.52, or 1.491 to 1.511, B is 0 to 0.005, 0 to 0.00580, or 0 to 0.00573, and C is 0 to $1*10^{-3}$, 0 to $5.0*10^{-4}$, or 0 to $4.1352*10^{-4}$ can be fulfilled.

For the second layer included in the low refractive layer, when fitting the polarization ellipticity measured by ellipsometry to a Cauchy model of Equation 1, the requirements that A is 1.0 to 1.50, B is 0 to 0.007 and C is 0 to $1*10^{-3}$ can be fulfilled, and for the second layer included in the low refractive layer, the requirements that A is 1.10 to 1.40, 1.20 to 1.35, or 1.211 to 1.349, B is 0 to 0.007, 0 to 0.00550, or 0 to 0.00513, and C is 0 to $1*10^{-3}$, 0 to $5.0*10^{-4}$, or 0 to $4.8685*10^{-4}$ can be fulfilled.

Meanwhile, in the anti-reflective film of the above-explained embodiment(s), the first layer and the second layer included in the low refractive layer may have different ranges of refractive indexes.

More specifically, the first layer included in the low refractive layer may have a refractive index of 1.420 to 1.600, 1.450 to 1.550, 1.480 to 1.520, or 1.491 to 1.511, at 550 nm. The second layer included in the low refractive layer may have a refractive index of 1.200 to 1.410, 1.210 to 1.400, or 1.211 to 1.375, at 550 nm.

The refractive index may be measured by commonly known methods, and for example, for each of the first layer and the second layer included in the low refractive layer, a refractive index at 550 nm can be calculated and determined using elliptic polarization measured at 380 nm to 1000 nm and a Cauchy model.

The first layer may have a thickness of 1 nm to 50 nm, 5 nm to 45 nm or 10 nm to 40 nm, the second layer may have a thickness of 5 nm to 300 nm, 10 nm to 250 nm or 15 nm to 200 nm.

The solid inorganic nanoparticles mean particles that have a maximum diameter of 100 nm or less, inside of which an empty space does not exist.

Further, the hollow inorganic nanoparticles mean particles that have a maximum diameter of 200 nm or less, on the surface and/or inside of which an empty space exists.

The solid inorganic nanoparticles may have a diameter of 0.5 to 100 nm, 1 to 50 nm, 1 to 30 nm or 1 to 20 nm.

The hollow inorganic nanoparticles may have a diameter of 1 to 200 nm, 10 to 100 nm or 40 to 70 nm.

The diameters of the solid inorganic nanoparticles and the hollow inorganic nanoparticles may mean the longest diameters confirmed in the cross-sections of the particles.

Meanwhile, the solid inorganic nanoparticles and the hollow inorganic nanoparticles may respectively contain one or more reactive functional groups selected from the group consisting of a (meth)acrylate group, an epoxide group, a vinyl group, and a thiol group on the surface. As the solid inorganic nanoparticles and the hollow inorganic nanoparticles respectively contain the above-explained reactive functional groups on the surfaces, the low refractive layer may have a higher cross-linking degree, thus securing more improved scratch resistance and anti-pollution properties.

Meanwhile, the above-explained low refractive layer may be prepared from a photocurable coating composition including a photopolymerizable compound, a fluorine-containing compound including a photoreactive functional group, hollow inorganic nanoparticles, solid inorganic nanoparticles, and a photoinitiator.

Thus, the binder resin included in the low refractive layer may include a (co)polymer of photopolymerizable compounds and a cross-linked (co)polymer of fluorine-containing compounds including photoreactive functional groups.

The photopolymerizable compound included in the photocurable coating composition may form a substrate of the binder resin of the prepared low refractive layer. Specifically, the photopolymerizable compound may include monomers or oligomers including (meth)acrylate or vinyl groups. More specifically, the photopolymerizable compound may include monomers or oligomers including one or more, two or more, or three or more (meth)acrylate or vinyl groups.

Specific examples of the monomers or oligomers including (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, thrylene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or mixtures of two or more kinds thereof, or urethane modified acrylate oligomers, epoxide acrylate oligomers, etheracrylate oligomers, dendritic acrylate oligomers, or mixture of two or more kinds thereof. Here, it is preferable that the molecular weight of the oligomer is 1000 to 10,000.

Specific examples of the monomers or oligomers including vinyl groups may include divinylbenzene, styrene, or paramethylstyrene.

Although the content of the photopolymerizable compound in the photocurable coating composition is not particularly limited, the content of the photopolymerizable compound in the solid content of the photocurable coating composition may be 5 to 80 wt %, 10 wt % to 70 wt % or 15 wt % to 50 wt % considering the mechanical properties of the finally prepared low refractive layer or anti-reflective film, etc. The solid content of the photocurable coating composition means only solid components excluding liquid components, for example, organic solvents, etc. that may be optionally included as described below, in the photocurable coating composition.

Meanwhile, the photocurable coating composition may further include fluorine-based (meth)acrylate-based monomers or oligomers, in addition to the above-explained monomers or oligomers. In case the photocurable coating composition further includes fluorine-based (meth)acrylate-based monomers or oligomers, the weight ratio of the fluorine-based (meth)acrylate-based monomers or oligomers to the monomer or oligomers including (meth)acrylate or vinyl groups may be 0.1% to 10%.

Specific examples of the fluorine-based (meth)acrylate-based monomers or oligomers may include one or more compounds selected from the group consisting of the following Chemical Formulas 1 to 5.

[Chemical Formula 1]

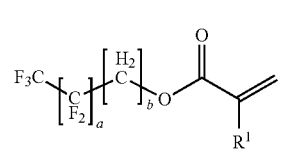

In Chemical Formula 1, $R^1$ is a hydrogen group or a C1-6 alkyl group, a is an integer of 0 to 7, and b is an integer of 1 to 3.

[Chemical Formula 2]

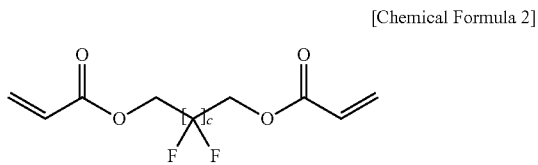

In Chemical Formula 2, c is an integer of 1 to 10.

[Chemical Formula 3]

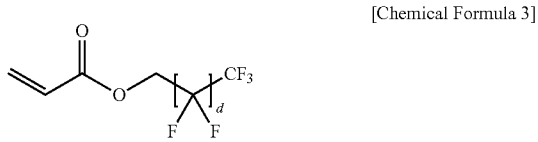

In Chemical Formula 3, d is an integer of 1 to 11.

[Chemical Formula 4]

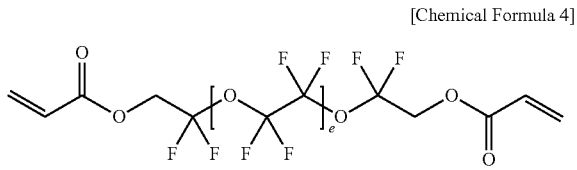

In Chemical Formula 4, e is an integer of 1 to 5.

[Chemical Formula 5]

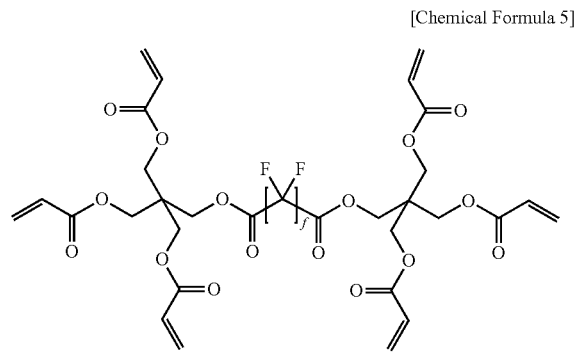

In Chemical Formula 5, f is an integer of 4 to 10.

Meanwhile, in the low refractive layer, a part derived from a fluorine-containing compound including a photoreactive functional group may be included.

In the fluorine-containing compound including a photoreactive functional group, one or more photoreactive functional groups may be included or substituted, wherein the photoreactive functional group means a functional group capable of participating in a polymerization reaction by the irradiation of light, for example, by the irradiation of visible rays or UV. The photoreactive functional group may include various functional groups known to be capable of participating in a polymerization reaction by the irradiation of light, and for example, may include a (meth)acrylate group, an epoxide group, a vinyl group or a thiol group.

Each fluorine-containing compound including a photoreactive functional group may have a weight average molecular weight (weight average molecular weight in terms of polystyrene, measured by GPC method) of 2000 to 200,000, and preferably 5000 to 100,000.

If the weight average molecular weight of the fluorine-containing compound including a photoreactive functional group is too small, the fluorine-containing compounds may not be uniformly and effectively arranged on the surface of the photocurable coating composition and may be positioned inside of the finally prepared low refractive layer, and thus the anti-pollution property of the surface of the low refractive layer may be deteriorated and the cross-linking density of the low refractive layer may be lowered, and thus the mechanical properties such as total strength, scratch resistance, etc. may be deteriorated.

Further, if the weight average molecular weight of the fluorine-containing compound including a photoreactive functional group is too high, compatibility with other components in the photocurable coating composition may be lowered, and thus haze of the finally prepared low refractive layer may increase or light transmittance may decrease, and strength of the low refractive layer may also be lowered.

Specifically, the fluorine-containing compound including a photoreactive functional group may include: i) aliphatic compounds or alicyclic compounds substituted by one or more photoreactive functional groups, in which at least one carbon is substituted by one or more fluorine atoms; ii) heteroaliphatic compounds or heteroalicyclic compounds substituted by one or more photoreactive functional groups, in which at least one hydrogen is substituted by fluorine, and at least one carbon is substituted by silicon; iii) polydialkyl siloxane-based polymers (for example, polydimethyl siloxane-based polymers) substituted by one or more photoreactive functional groups, in which at least one silicon is substituted by one or more fluorine atoms; and iv) polyether compounds substituted by one or more photoreactive functional groups, in which at least one hydrogen is substituted by fluorine, or mixtures or copolymers of two or more kinds of i) to iv).

The photocurable coating composition may include, based on 100 parts by weight of the photopolymerizable compound, 20 to 300 parts, 30 to 250 parts, or 40 to 200 parts by weight of the fluorine-containing compound including a photoreactive functional group.

If the fluorine-containing compound including a photoreactive functional group is added in an excess amount based on the photopolymerizable compound, coatability of the photocurable coating composition may be deteriorated or a low refractive layer obtained from the photocurable coating composition may not have sufficient durability or scratch resistance. Further, if the amount of the fluorine-containing compound including a photoreactive functional group is too small based on the photopolymerizable compound, a low refractive layer obtained from the photocurable coating composition may not have sufficient mechanical properties such as anti-pollution property, scratch resistance, etc.

The fluorine-containing compound including a photoreactive functional group may further include silicon or a silicon compound. That is, the fluorine-containing compound including a photoreactive functional group may optionally contain silicon or a silicon compound therein, and specifically, the content of silicon in the fluorine-containing compound including a photoreactive functional group may be 0.1 to 20 wt %.

The silicon included in the fluorine-containing compound including a photoreactive functional group may increase compatibility with other components included in the photocurable coating composition, thus preventing generation of haze in the finally prepared refractive layer, thereby increasing transparency. Meanwhile, if the content of silicon becomes too high in the fluorine-containing compound including a photoreactive functional group, compatibility between the fluorine-containing compound and the other components included in the photocurable coating composition may be rather deteriorated, and thus the finally prepared low refractive layer or anti-reflective film may not have sufficient light transmittance or anti-reflective performance, and the anti-pollution property of the surface may also be deteriorated.

The low refractive layer may include, based on 100 parts by weight of the (co)polymer of the photopolymerizable compounds, 10 to 400 parts, 100 to 350 parts or 130 to 300 parts by weight of the hollow inorganic nanoparticles and 10 to 400, 30 to 200 parts or 50 to 100 parts parts by weight of the solid inorganic nanoparticles.

If the content of the hollow inorganic nanoparticles and the solid inorganic nanoparticles becomes excessive in the low refractive layer, the hollow inorganic nanoparticles and the solid inorganic nanoparticles may exist mixedly without sufficient phase separation therebetween in the preparation process of the low refractive layer, and thus reflectance may increase, and surface unevenness may be excessively generated, thus deteriorating the anti-pollution property. Further, if the content of the hollow inorganic nanoparticles and the solid inorganic nanoparticles is too small in the low refractive layer, it may be difficult for the majority of the solid inorganic particles to be positioned near the interface between the hard coating layer and the low refractive layer, and the reflectance of the low refractive layer may significantly increase.

The low refractive layer may have a thickness of 1 to 300 nm, 50 to 200 nm, 100 nm to 150 nm.

Meanwhile, as the hard coating layer, commonly known hard coating layers may be used without specific limitations.

One example of the hard coating layer may include a hard coating layer including a binder resin including a photocurable resin and organic or inorganic fine particles dispersed in the binder resin.

The photocurable resin included in the hard coating layer may be a polymer of photocurable compounds capable of inducing a polymerization reaction if light such as UV, etc., is irradiated, as is commonly known in the art. Specifically, the photocurable resin may include one or more selected from the group consisting of: reactive acrylate oligomers such as a urethane acrylate oligomer, an epoxide acrylate oligomer, a polyester acrylate, and a polyether acrylate; and multifunctional acrylate monomers such as dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,5-hexanediol acrylate, propoxylated glycerol triacrylate, tripropylene glycol diacrylate, and ethylene glycol diacrylate.

Although the particle diameter of the organic or inorganic fine particles is not specifically limited, for example, the organic fine particles may have a particle diameter of 1 to 10 μm, 1.5 to 9 μm or 2 to 8 μm, and the inorganic fine particles may have a particle diameter of 1 to 500 nm, or 1 to 300 nm. The particle diameter of the organic or inorganic fine particles may be defined as a volume average particle diameter.

Further, although specific examples of the organic or inorganic fine particles included in the hard coating film are not limited, for example, the organic or inorganic fine particles may be organic fine particles selected from the group consisting of acryl-based resins, styrene-based resins, epoxide resins, and nylon resins, or inorganic fine particles selected from the group consisting of silicon oxide, titanium dioxide, indium oxide, tin oxide, zirconium oxide, and zinc oxide.

The binder resin of the hard coating layer may further include a high molecular weight (co)polymer with a weight average molecular weight of 10,000 or more.

The high molecular weight (co)polymer may be one or more selected from the group consisting of a cellulose-based polymer, an acryl-based polymer, a styrene-based polymer, an epoxide-based polymer, a nylon-based polymer, a urethane-based polymer, and a polyolefin-based polymer.

Another example of the hard coating film may include a hard coating film including a binder resin of a photocurable resin, and an antistatic agent dispersed in the binder resin.

The photocurable resin included in the hard coating layer may be a polymer of photocurable compounds capable of inducing a polymerization reaction by the irradiation of light such as UV, etc., as is commonly known in the art. However, preferably, the photocurable compound may be multifunctional (meth)acrylate-based monomers or oligomers, wherein it is advantageous in terms of securing of the properties of the hard coating layer that the number of (meth)acrylate-based functional groups is 2 to 10, preferably 2 to 8, and more preferably 2 to 7. More preferably, the photocurable compound may be one or more selected from the group consisting of pentaerythritol tri(meth)acrylate, pentaerythritol tetra(meth)acrylate, dipentaerythritol penta (meth)acrylate, dipentaerythritol hexa(meth)acrylate, dipentaerythritol hepta(meth)acrylate, tripentaerythritol hepta(meth)acrylate, thrylene diisocyanate, xylene diisocyanate, hexamethylene diisocyanate, trimethylol propane tri(meth)acrylate, and trimethylol propane polyethoxy tri(meth)acrylate.

The antistatic agent may be: a quaternary ammonium salt compound; a pyridinium salt; a cationic compound having 1 to 3 amino groups; an anionic compound such as a sulfonic acid base, a sulfuric ester base, a phosphoric ester base, a phosphonic acid base, etc.; an amphoteric compound such as an amino acid-based, an amino sulfuric ester-based compound, etc.; a non-ionic compound such as an imino alcohol-based compound, a glycerin-based compound, a polyethylene glycol-based compound, etc.; an organometal compound such as a metal alkoxide compound containing tin or titanium, etc.; a metal chelate compound such as an acetylacetonate salt of the organometal compound, etc.; reactants or polymerized products of two or more kinds of these compounds; or mixtures of two or more kinds of these compounds. Here, the quaternary ammonium salt compound may be a compound having one or more quaternary ammonium salt groups in the molecule, and a low molecular type or a high molecular type may be used without limitations.

As the antistatic agent, a conductive polymer and metal oxide fine particles may also be used. The conductive polymer may include aromatic conjugated poly(paraphenylene), heterocyclic conjugated polypyrrole, polythiophene, aliphatic conjugated polyacetylene, heteroatom-containing conjugated polyaniline, mixed conjugated poly(phenylene vinylene), a multichain type of conjugated compound which is a conjugated compound having multiple conjugated chains in the molecule, a conductive complex in which a conjugated polymer chain is grafted on or block copolymerized with a saturated polymer, etc. The metal oxide fine particles may include zinc oxide, antimony oxide, tin oxide, cerium oxide, indium tin oxide, indium oxide, aluminum oxide, antimony-doped tin oxide, aluminum-doped zinc oxide, etc.

The hard coating film including a binder resin of a photocurable resin, and an antistatic agent dispersed in the binder resin, may further include one or more compounds selected from the group consisting of alkoxy silane-based oligomers and metal alkoxide-based oligomers.

Although the alkoxy silane-based compound may be one commonly used in the art, preferably, it may include one or more compounds selected from the group consisting of tetramethoxysilane, tetraethoxysilane, tetraisopropoxysilane, methyltrimethoxysilane, methyltriethoxysilane, methacryloxypropyltrimethoxysilane, glycidoxy propyl trimethoxy silane, and glycidoxy propyl triethoxy silane.

The metal alkoxide-based oligomer may be prepared by the sol-gel reaction of a composition including a metal alkoxide-based compound and water. The sol-gel reaction may be conducted by a similar method to the above-explained preparation method of an alkoxy silane-based oligomer.

However, since the metal alkoxide-based compound may rapidly react with water, the sol-gel reaction may be conducted by diluting the metal alkoxide-based compound in an organic solvent, and then slowly dripping water thereto. At this time, considering the reaction efficiency, it is preferable that the mole ratio of the metal alkoxide-based compound to water (based on metal ions) is controlled within a range of 3 to 170.

Here, the metal alkoxide-based compound may be one or more compounds selected from the group consisting of titanium tetra-isopropoxide, zirconium isopropoxide, and aluminum isopropoxide.

The hard coating layer may have a thickness of 0.1 to 100 μm, 1 μm to 80 μm or 3 μm to 50 μm.

The anti-reflective film may further include a substrate bonded to the other side of the hard coating layer. Specific kinds or thicknesses of the substrate are not limited, and substrates known to be used in the preparation of low refractive layers or anti-reflective films may be used without specific limitations.

Meanwhile, the anti-reflective film of the embodiment may be provided by a preparation method of an anti-reflective film including the steps of: applying a resin composition for forming a low refractive layer including a photocurable compound or a (co)polymer thereof, a fluorine-containing compound including a photoreactive functional group, a photoinitiator, hollow inorganic nanoparticles, and solid inorganic nanoparticles on a hard coating layer, and drying at a temperature of 35 to 100° C., 40 to 90 t or 40 to 80° C.; and photocuring the dried product of the resin composition.

Specifically, the anti-reflective film provided by the preparation method of an anti-reflective film distributes hollow inorganic nanoparticles and solid inorganic nanoparticles so as to be distinguished from each other in the low refractive layer, thereby simultaneously realizing high scratch resistance and anti-pollution properties while having low reflectance and high light transmittance.

More specifically, the anti-reflective film includes: a hard coating layer; and a low refractive layer that is formed on one side of the hard coating layer, and includes a binder resin, and hollow inorganic nanoparticles and solid inorganic nanoparticles dispersed in the binder resin, wherein 70 vol % or more of the total solid inorganic nanoparticles may exist within 50% of the total thickness of the low refractive layer from the interface between the hard coating layer and the low refractive layer.

In addition, 30 vol % or more of the total hollow inorganic nanoparticles may exist farther than the total solid inorganic nanoparticles, in the thickness direction of the low-refraction layer from the interface between the hard coating layer and the low-refraction layer.

Further, 70 vol % or more of the total solid inorganic nanoparticles may exist within 30% of the total thickness of the low-refraction layer from the interface between the hard coating layer and the low-refraction layer. Additionally, 70 vol % or more of the total hollow inorganic nanoparticles may exist at a region exceeding 30% of the total thickness of the low-refraction layer from the interface between the hard coating layer and the low-refraction layer.

In the anti-reflective film provided by the above-described preparation method of an anti-reflective film, the low-refraction layer may include a first layer including 70 vol % or more of the total solid inorganic nanoparticles and a second layer including 70 vol % or more of the total hollow inorganic nanoparticles, and the first layer may be positioned nearer to the interface between the hard coating layer and the low-refraction layer than the first layer.

The low refractive layer may be formed by applying a resin composition for forming a low refractive layer including a photocurable compound or a (co)polymer thereof, a fluorine-containing compound including a photoreactive functional group, a photoinitiator, hollow inorganic nanoparticles, and solid inorganic nanoparticles on a hard coating layer, and drying at a temperature of 35 to 100° C., or 40 to 80° C.

If the temperature of drying the resin composition for forming a low refractive layer applied on a hard coating layer is less than 35° C., the anti-pollution property of the formed low refractive layer may be significantly deteriorated. Further, if the temperature of drying the resin composition for forming a low refractive layer applied on a hard coating layer is greater than 100° C., the hollow inorganic nanoparticles and the solid inorganic nanoparticles may exist mixedly without sufficient phase separation therebetween, and thus the scratch resistance and anti-pollution properties of the low refractive layer may be deteriorated and the reflectance may significantly increase.

In the process of drying the resin composition for forming a low refractive layer applied on the hard coating layer, by controlling the density difference between the solid inorganic nanoparticles and the hollow inorganic nanoparticles as well as the drying temperature, a low refractive layer having the above-explained properties may be formed. The solid inorganic nanoparticles may have 0.50 g/cm$^3$ or more higher density than the hollow inorganic nanoparticles, and due to such a density difference, the solid inorganic nanoparticles may be positioned nearer to the hard coating layer in a low refractive layer formed on the hard coating layer.

Specifically, the solid inorganic nanoparticles may have a density of 2.00 g/cm$^3$ to 4.00 g/cm$^3$, and the hollow inorganic nanoparticles may have a density of 1.50 g/cm$^3$ to 3.50 g/cm$^3$.

Meanwhile, the step of drying the resin composition for forming a low refractive layer applied on the hard coating layer at a temperature of 35 to 100° C. may be conducted for 10 s to 5 min, or 30 s to 4 min.

If the drying time is too short, phase separation between the solid inorganic nanoparticles and the hollow inorganic nanoparticles may not sufficiently occur. To the contrary, if the drying time is too long, the low refractive layer formed may erode the hard coating layer.

The low refractive layer may be prepared from a photocurable coating composition including a photocurable compound or a (co)polymer thereof, a fluorine-containing compound including a photoreactive functional group, hollow inorganic nanoparticles, solid inorganic nanoparticles, and a photoinitiator.

The low refractive layer may be obtained by applying the photocurable coating composition on a predetermined substrate and photocuring the applied substance. Specific kinds or thicknesses of the substrate are not significantly limited, and any substrates known to be used for the preparation of low refractive layers or anti-reflective films may be used without specific limitations.

For the application of the photocurable coating composition, commonly used methods and apparatuses may be used without specific limitations, and for example, bar coating such as with a Meyer bar, etc., gravure coating, 2 roll reverse coating, vacuum slot die coating, 2 roll coating, etc. may be used.

The low refractive layer may have a thickness of 1 to 300 nm, or 50 to 200 nm. Thus, the thickness of the photocurable coating composition applied on the predetermined substrate may be about 1 to 300 nm, or 50 to 200 nm.

In the step of photocuring the photocurable coating composition, UV or visible rays of a 200 to 400 nm wavelength may be irradiated, and the exposure amount may be 100 to 4000 mJ/cm$^2$. The exposure time is not specifically limited, and may be appropriately changed according to the exposure apparatus used, the wavelength of irradiated light rays, or an exposure amount.

Further, in the step of photocuring the photocurable coating composition, nitrogen purging, etc. may be conducted so as to apply a nitrogen atmosphere condition.

The details of the photocurable compound, hollow inorganic nanoparticles, solid inorganic nanoparticles, and fluorine-containing compound including a photoreactive functional group are as explained above.

The hollow inorganic nanoparticles and the solid inorganic nanoparticles may be respectively included in the composition as a colloidal phase dispersed in a predetermined dispersion medium. Each colloidal phase including the hollow inorganic nanoparticles and the solid inorganic nanoparticles may include an organic solvent as a dispersion medium.

Each content of the hollow inorganic nanoparticles and the solid inorganic nanoparticles in a colloidal phase may be determined considering each content range of the hollow inorganic nanoparticles and the solid inorganic nanoparticles in the photocurable coating composition or the viscosity of the photocurable coating composition, etc., and for example, each solid content of the hollow inorganic nanoparticles and the solid inorganic nanoparticles in the colloidal phase may be 5 to 60 wt %.

Here, as the organic solvent in the dispersion medium, alcohols such as methanol, isopropyl alcohol, ethylene glycol, butanol, etc.; ketones such as methyl ethyl ketone, methyl isobutyl ketone, etc.; aromatic hydrocarbons such as toluene, xylene, etc.; amides such as dimethylformamide, dimethylacetamide, N-methylpyrrolidone, etc.; esters such as ethyl acetate, butyl acetate, gamma butyrolactone, etc.; ethers such as tetrahydrofuran, 1,4-dioxane, etc.; or mixtures thereof may be included.

As the photopolymerization initiator, any compounds known to be usable in a photocurable resin composition may be used without significant limitations, and specifically, a benzophenone-based compound, an acetophenone-based compound, a biimidazole-based compound, a triazine-based compound, an oxime-based compound, or mixtures of two or more kinds thereof may be used.

The photopolymerization initiator may be used in the content of 1 to 100 parts, 5 to 80 parts or 7 to 60 parts by weight, based on 100 parts by weigh of the photopolymerizable compound. If the content of the photopolymerization initiator is too small, in the step of photocuring of the photocurable coating composition, a material that is not cured in the photocuring step and remains may be generated. If the content of the photopolymerization initiator is too large, unreacted initiator may remain as an impurity or a cross-linking degree may be lowered, and thus the mechanical properties of the prepared film may be deteriorated or reflectance may significantly increase.

The photocurable coating composition may further include an organic solvent.

Non-limiting examples of the organic solvent may include, for example, ketones, alcohols, acetates, ethers, and mixtures of two or more kinds thereof.

Specific examples of the organic solvent may include ketones such as methyl ethyl ketone, methyl isobutyl ketone, acetylacetone, isobutyl ketone, etc.; alcohols such as methanol, ethanol, diacetone alcohol, n-propanol, i-propanol, n-butanol, i-butanol, t-butanol, etc.; acetates such as ethyl acetate, i-propyl acetate, polyethylene glycol monomethylether acetate, etc.; ethers such as tetrahydrofuran, propylene glycol monomethylether, etc.; and mixtures of two or more kinds thereof.

The organic solvent may be added when mixing the components included in the photocurable coating composition, or each component may be added while being dispersed in or mixed in the organic solvent. If the content of the organic solvent in the photocurable coating composition is too small, flowability of the photocurable coating composition may be deteriorated, and thus faults such as stripes, etc. may be generated in the finally prepared film. If the organic solvent is excessively added, the solid content may decrease, and thus coating and film formation may not be sufficiently achieved, thus deteriorating the properties or surface property of the film, and generating faults in the process of drying and curing. Thus, the photocurable coating composition may include an organic solvent such that the total solid concentration of the included components may become 1 to 50 wt %, or 2 to 20 wt %.

As the hard coating layer, a material known to be usable in an anti-reflective film may be used without specific limitations.

The components used for the formation of the hard coating layer are as explained above with regard to the anti-reflective film of the embodiment.

For the application of the polymer resin composition for forming a hard coating layer, commonly used methods and apparatuses may be used without specific limitations, and for example, bar coating such as with a Meyer bar, etc., gravure coating, 2 roll reverse coating, vacuum slot die coating, 2 roll coating, etc. may be used.

In the step of photocuring the polymer resin composition for forming a hard coating layer, UV or visible rays of a 200 to 400 nm wavelength may be irradiated, wherein the exposure amount may preferably be 100 to 4000 mJ/cm$^2$. The exposure time is not specifically limited, and may be appropriately changed according to the exposure apparatus used, the wavelength of irradiated light rays, or an exposure amount. Also, in the step of photocuring the polymer resin composition for forming a hard coating layer, nitrogen purging, etc. may be conducted so as to apply a nitrogen atmosphere condition.

Advantageous Effects

According to the present invention, an anti-reflective film that has low reflectance and high light transmittance, that can simultaneously realize high scratch resistance and anti-pollution properties, and that can increase the screen sharpness of a display device, and a method for preparing the anti-reflective film, are provided.

DETAILED DESCRIPTION OF THE EMBODIMENTS

Figure 1:
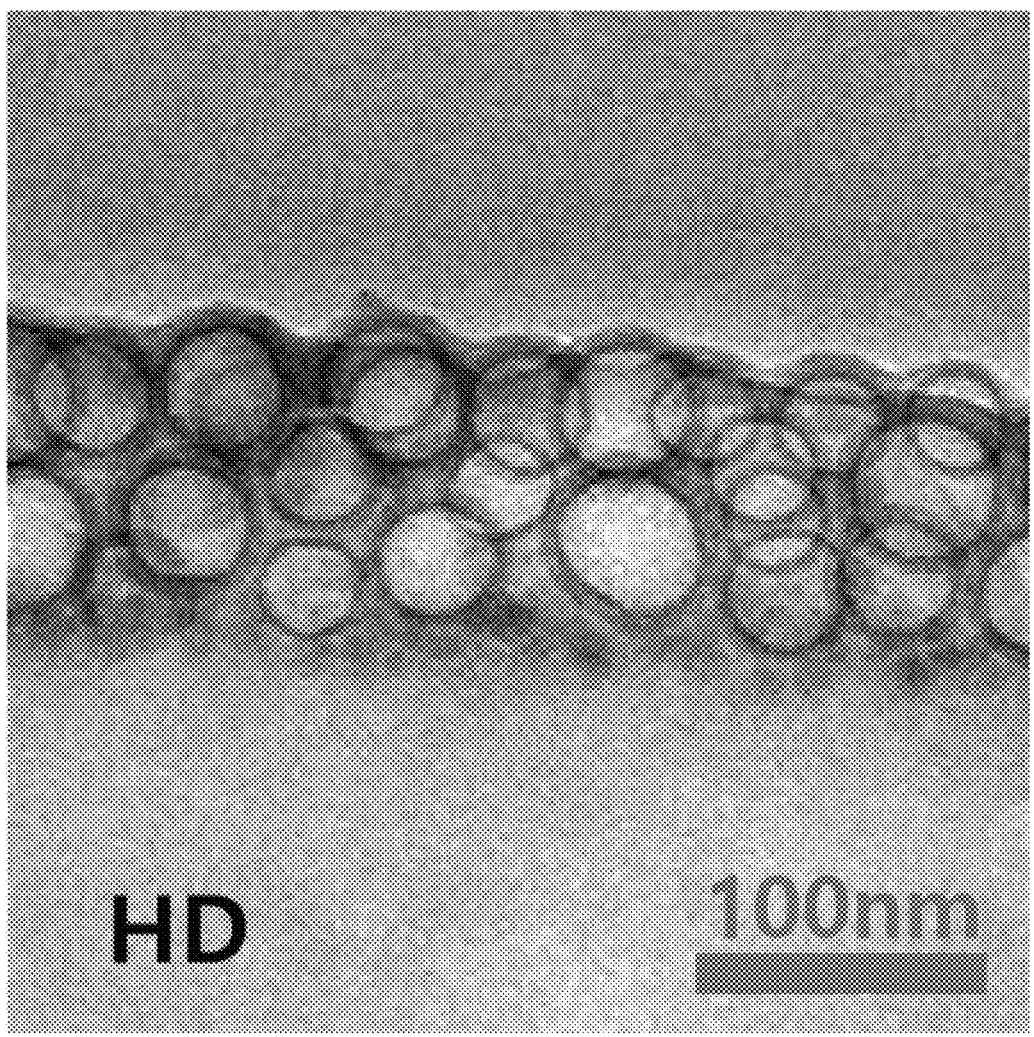
FIG. 1 shows the cross-sectional TEM image of the anti-reflective film of Example 1.
Figure 2:
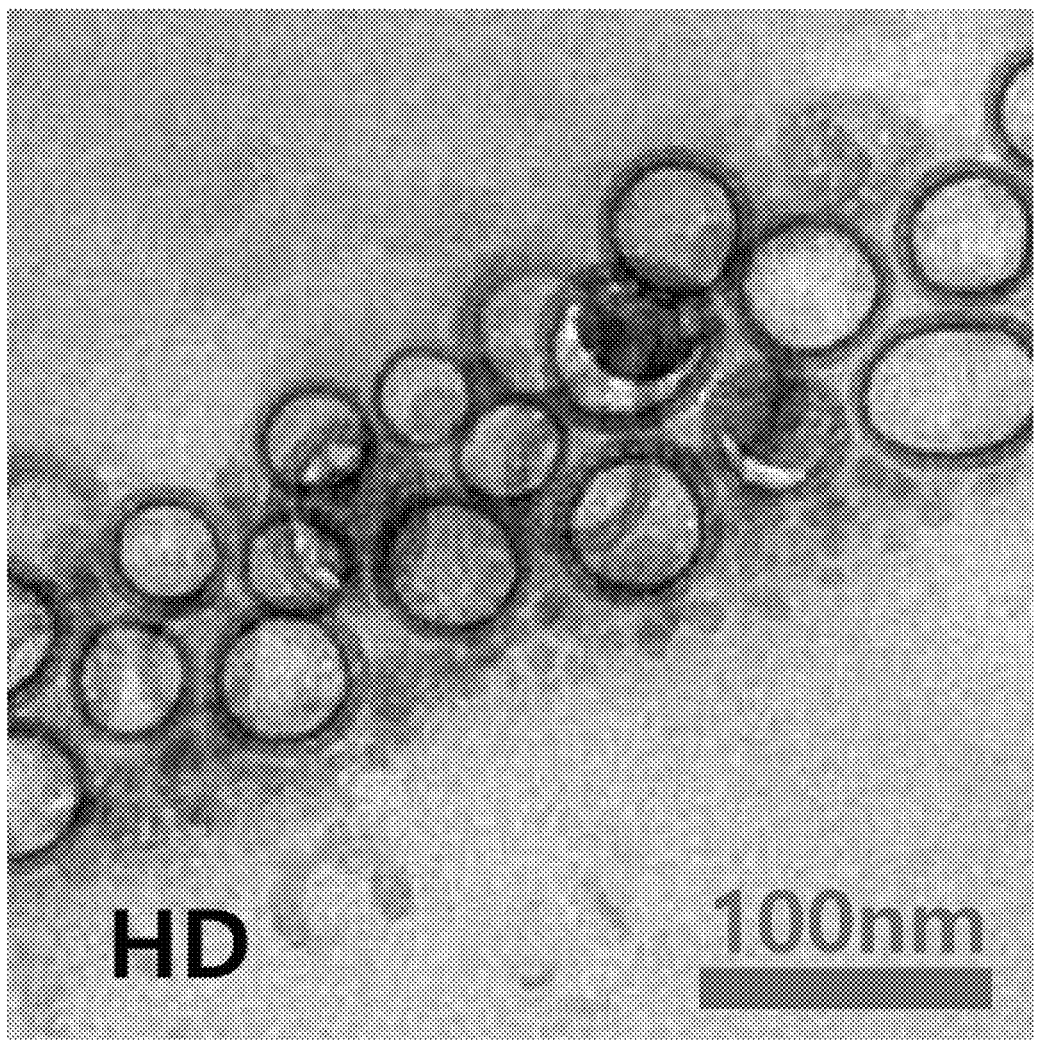
FIG. 2 shows the cross-sectional TEM image of the anti-reflective film of Example 2.
Figure 3:
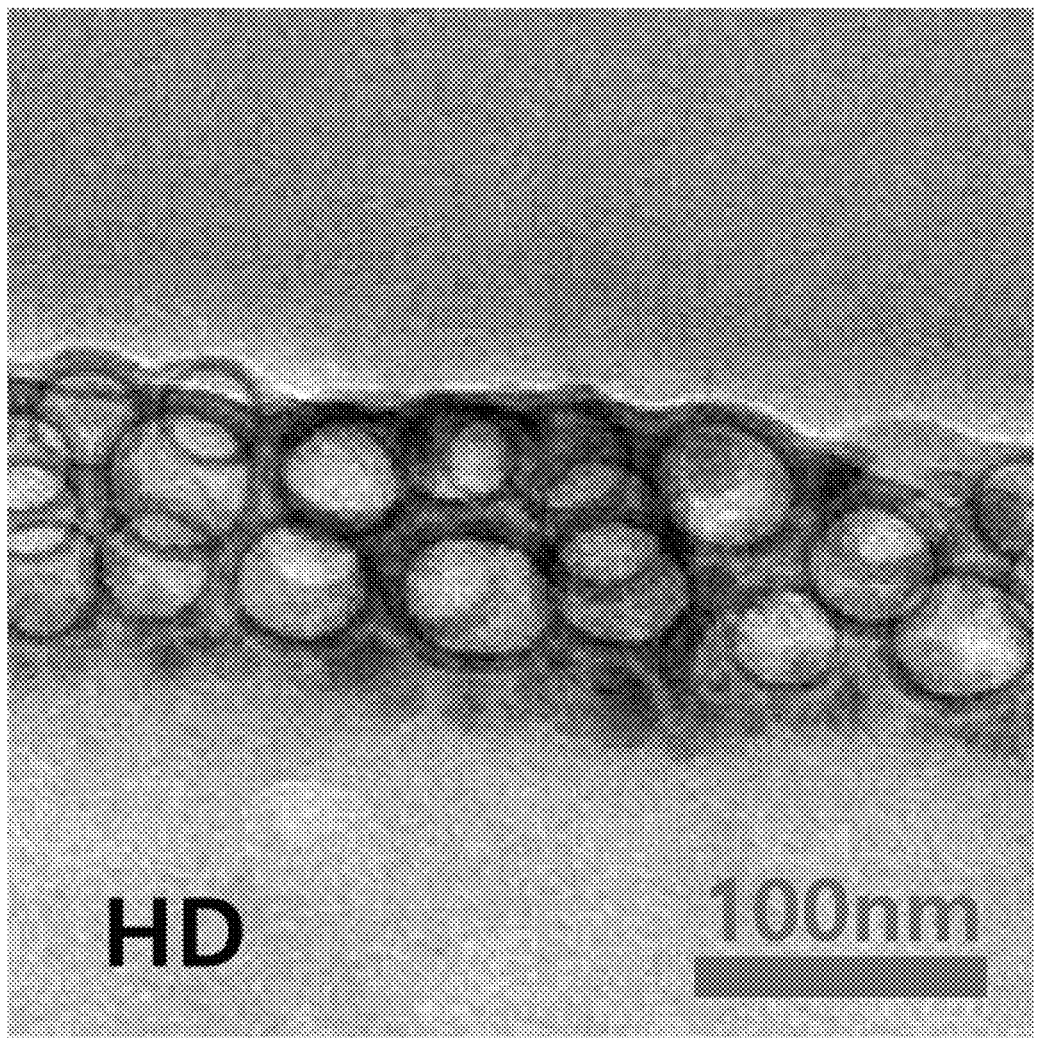
FIG. 3 shows the cross-sectional TEM image of the anti-reflective film of Example 3.
Figure 4:
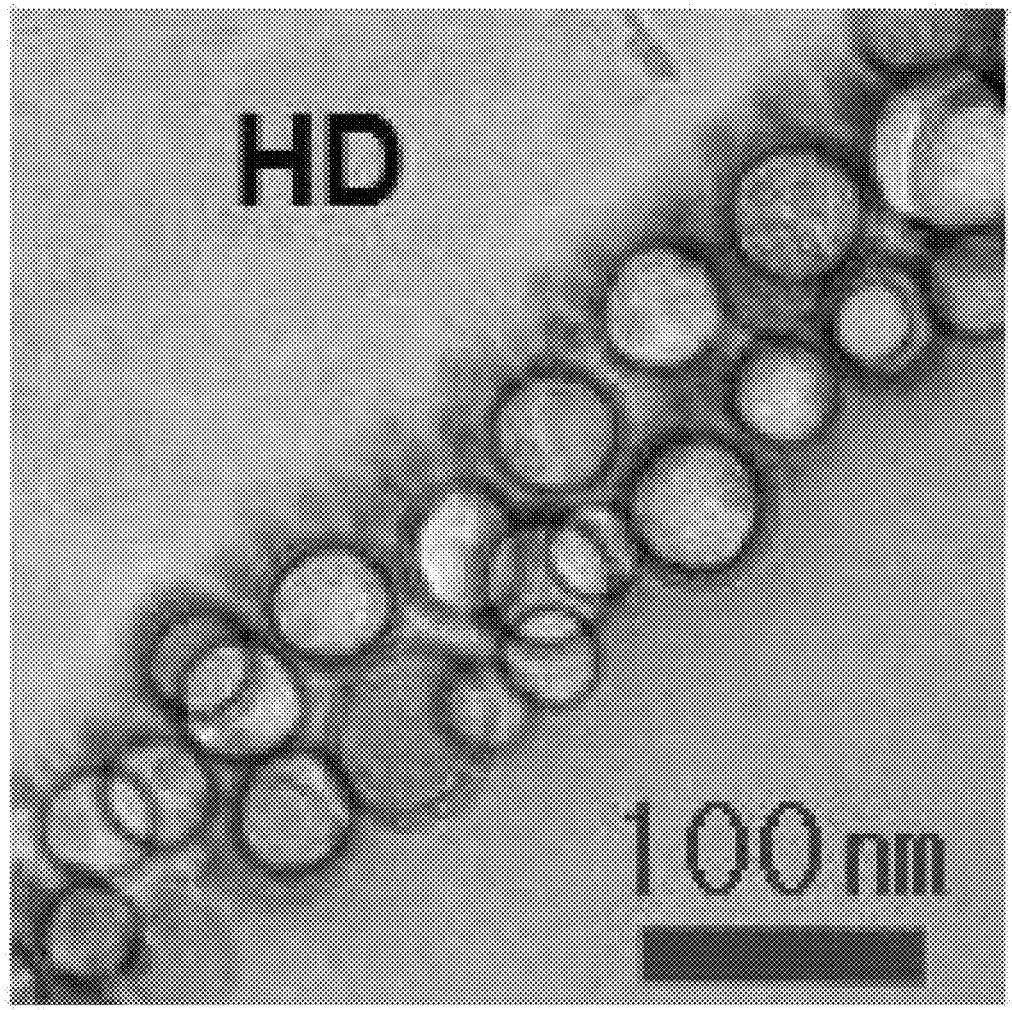
FIG. 4 shows the cross-sectional TEM image of the anti-reflective film of Example 4.
Figure 5:
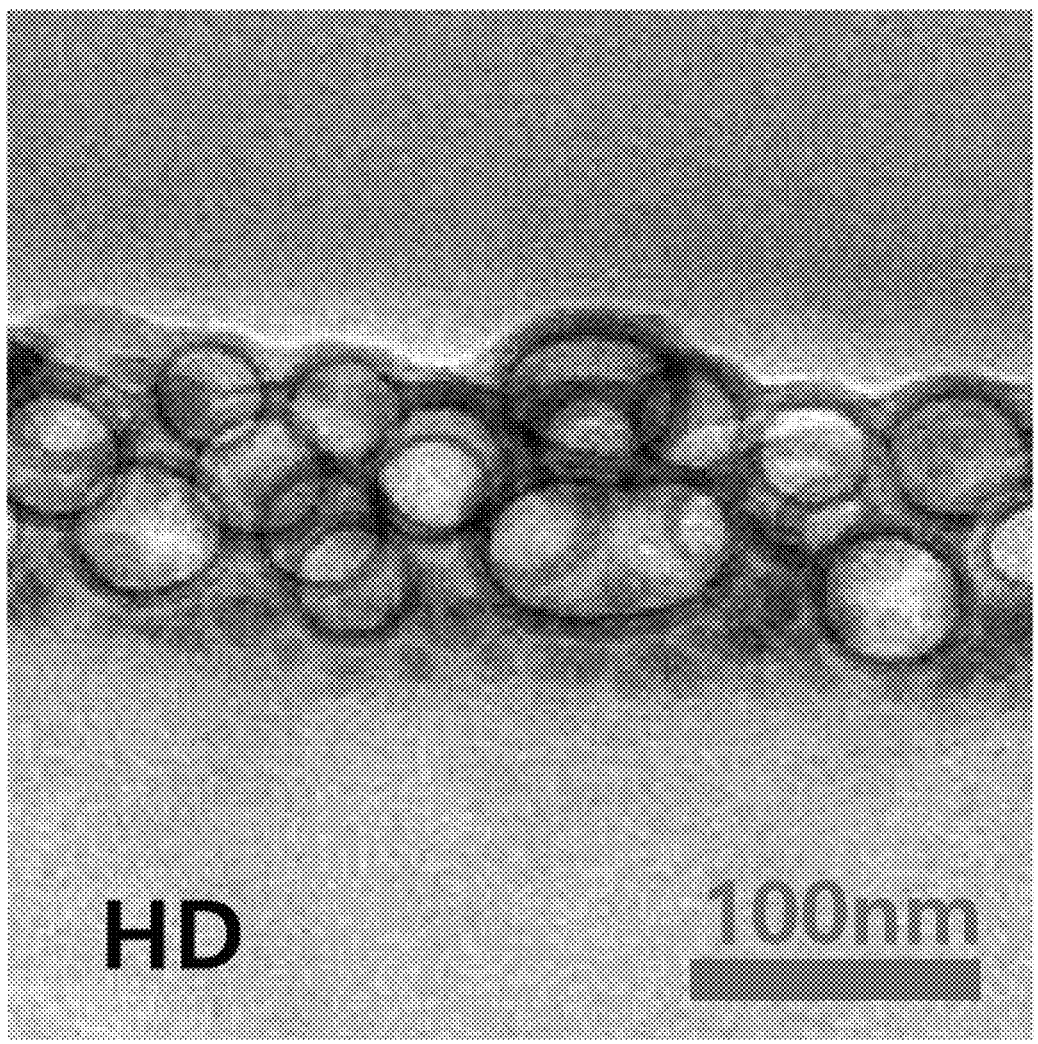
FIG. 5 shows the cross-sectional TEM image of the anti-reflective film of Example 5.
Figure 6:
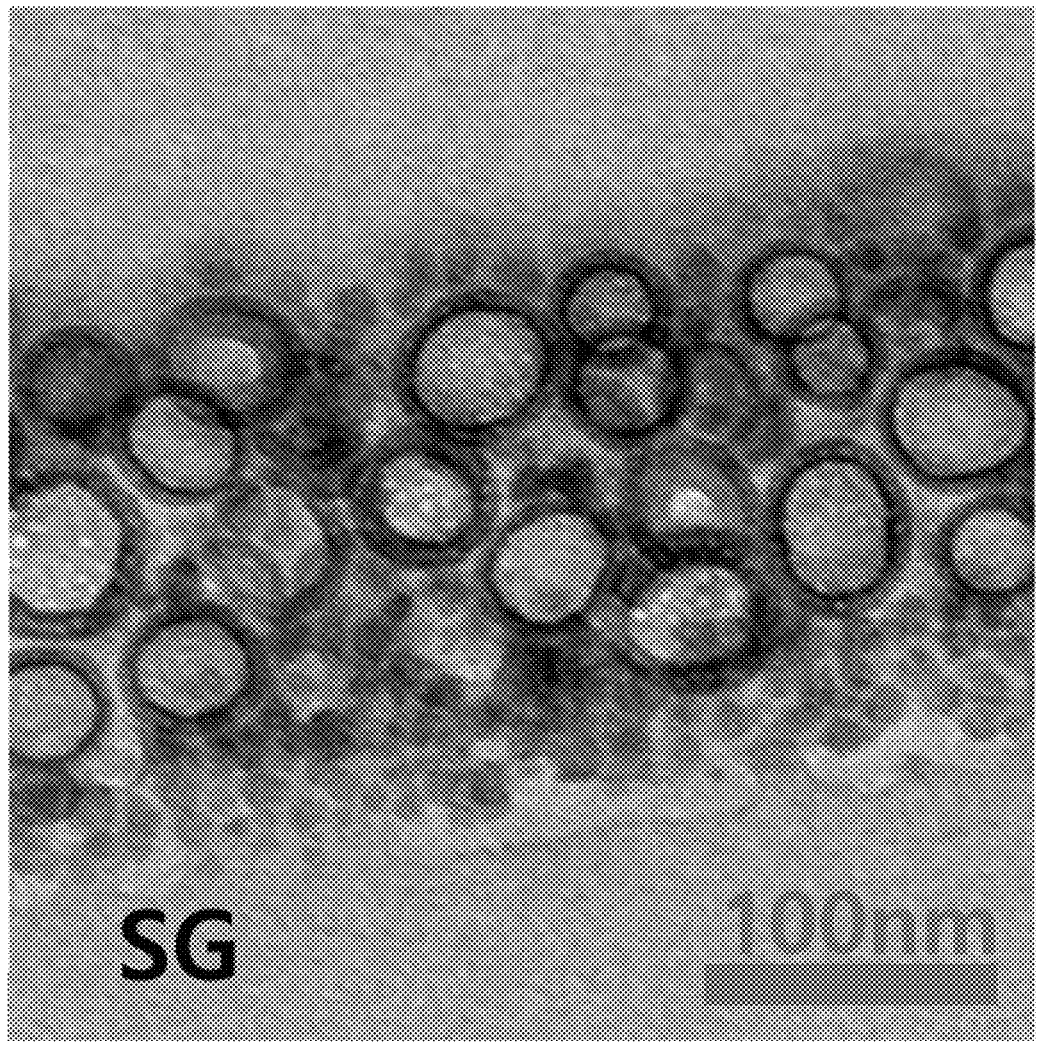
FIG. 6 shows the cross-sectional TEM image of the anti-reflective film of Example 6.

The present invention will be explained in detail in the following examples. However, these examples are presented only as the illustrations of the present invention, and the scope of the present invention is not limited thereby.

Preparation Example

Preparation Example: Preparation of a Hard Coating Film
A salt type of antistatic hard coating liquid manufactured by KYOEISHA Company (solid content 50 wt %, product name: LJD-1000) was coated on a triacetyl cellulose film with a #10 Meyer bar and dried at 90° C. for 1 min, and then irradiated by UV at 150 mJ/cm² to prepare a hard coating film with a thickness of about 5 to 6 μm.

Examples 1 to 5: Preparation of an Anti-Reflective Film

Examples 1 to 4

(1) Preparation of a Photocurable Coating Composition for Forming a Low Refractive Layer
Based on 100 parts by weight of pentaerythritol triacrylate (PETA), 281 parts by weight of hollow silica nanoparticles (diameter: about 50 to 60 nm, density: 1.96 g/cm³, manufactured by JSC Catalysts and Chemicals Ltd.), 63 parts by weight of solid silica nanoparticles (diameter: about 12 nm, density: 2.65 g/cm³), 131 parts by weight of a first fluorine-containing compound (X-71-1203M, ShinEtsu Chemical Co., Ltd.), 19 parts by weight of a second fluorine-containing compound (RS-537, DIC Corporation), and 31 parts by weight of an initiator (Irgacure 127, Ciba Corporation) were diluted in a MIBK (methyl isobutyl ketone) solvent such that the solid concentration became 3 wt %.
(2) Preparation of a Low Refractive Layer and an Anti-Reflective Film
On the hard coating film of the preparation example, the above-obtained photocurable coating composition was coated to a thickness of about 110 to 120 nm with a #4 Meyer bar, and dried and cured using the temperature and time as described in the following Table 1. During the curing, UV at 252 mJ/cm² was irradiated to the dried coating under nitrogen purging.

Example 5

(1) Preparation of a Photocurable Coating Composition for Forming a Low Refractive Layer
Based on 100 parts by weight of trimethylolpropane triacrylate (TMPTA), 268 parts by weight of hollow silica nanoparticles (diameter: about 50 to 60 nm, density: 1.96 g/cm³, manufactured by JSC Catalysts and Chemicals Ltd.), 55 parts by weight of solid silica nanoparticles (diameter: about 12 nm, density: 2.65 g/cm³), 144 parts by weight of a first fluorine-containing compound (X-71-1203M, ShinEtsu Chemical Co., Ltd.), 21 parts by weight of a second fluorine-containing compound (RS-537, DIC Corporation), and 31 parts by weight of an initiator (Irgacure 127, Ciba Corporation) were diluted in a MIBK (methyl isobutyl ketone) solvent such that the solid concentration became 3 wt %.
(2) Preparation of a Low Refractive Layer and an Anti-Reflective Film
On the hard coating film of the preparation example, the above-obtained photocurable coating composition was coated to a thickness of about 110 to 120 nm with a #4 Meyer bar, and dried and cured using the temperature and time as described in the following Table 1. During the curing, UV at 252 mJ/cm² was irradiated to the dried coating under nitrogen purging.

TABLE 1

|  | Drying temperature | Drying time |
|---|---|---|
| Example 1 | 40° C. | 1 min |
| Example 2 | 60° C. | 1 min |
| Example 3 | 80° C. | 1 min |
| Example 4 | 60° C. | 2 min |
| Example 5 | 60° C. | 3 min |

Example 6

(1) Preparation of a Hard Coating Layer (HD2)

30 g of pentaerythritol triacrylate, 2.5 g of a high molecular weight copolymer (BEAMSET 371, Arakawa Co. Ltd., Epoxy Acrylate, molecular weight 40,000), 20 g of methyl ethyl ketone, and 0.5 g of a leveling agent (Tego Wet 270) were uniformly mixed, and then 2 g of an acryl-styrene copolymer (volume average particle diameter: 2 μm, Manufacturing Company: Sekisui Plastic) with a refractive index of 1.525 was added as fine particles to prepare a hard coating composition.

The above-obtained hard coating composition was coated on a triacetyl cellulose film with a #10 Meyer bar and dried at 90° C. for 1 min. The dried coating was irradiated by UV at 150 mJ/cm$^2$ to prepare a hard coating layer with a thickness of 5 μm.

(2) Preparation of a Low Refractive Layer and an Anti-Reflective Film

Based on 100 parts by weight of pentaerythritol triacrylate (PETA), 135 parts by weight of hollow silica nanoparticles (diameter: about 50 to 60 nm, density: 1.96 g/cm$^3$, manufactured by JSC Catalysts and Chemicals Ltd.), 88 parts by weight of solid silica nanoparticles (diameter: about 12 nm, density: 2.65 g/cm$^3$), 38 parts by weight of a first fluorine-containing compound (X-71-1203M, ShinEtsu Chemical Co., Ltd.), 11 parts by weight of a second fluorine-containing compound (RS-537, DIC Corporation), and 7 parts by weight of an initiator (Irgacure 127, Ciba Corporation) were diluted in a mixed solvent of MIBK (methyl isobutyl ketone):diacetone alcohol (DAA):isopropyl alcohol at a weight ratio of 3:3:4 such that the solid concentration became 3 wt %, thus preparing a photocurable coating composition for forming a low refractive layer.

On the above-prepared hard coating film (HD2), the above-obtained photocurable coating composition for forming a low refractive layer was coated to a thickness of about 110 to 120 nm with a #4 Meyer bar, and dried and cured at a temperature of 60° C. for 1 min. During the curing, UV at 252 mJ/cm$^2$ was irradiated to the dried coating under nitrogen purging.

Comparative Examples: Preparation of an Anti-Reflective Film

Comparative Example 1

An anti-reflective film was prepared by the same method as in Example 1, except that the photocurable coating composition for forming a low refractive layer was applied and dried at room temperature (25° C.).

Comparative Example 2

A photocurable coating composition for forming a low refractive layer was prepared by the same method as in Example 1, except that 63 parts by weight of the solid silica nanoparticles used in Example 1 were replaced by 63 parts by weight of pentaerythritol triacrylate (PETA), and an anti-reflective layer was prepared by the same method as in Example 1.

Comparative Example 3

An anti-reflective film was prepared by the same method as in Example 5, except that the photocurable coating composition for forming a low refractive layer was applied and dried at 140° C.

Experimental Example: Measurement of the Properties of Anti-Reflective Films

For the anti-reflective films obtained in the examples and comparative examples, the following experiments were conducted.

1. Measurement of Mean Reflectance of an Anti-Reflective Film

The mean reflectances of the anti-reflective films of the examples and comparative examples at a visible light region (380 to 780 nm) were measured using Solidspec 3700 (SHIMADZU).

2. Measurement of Anti-Pollution Property

On the surface of the anti-reflective films obtained in the examples and comparative examples, straight lines with a length of 5 cm were drawn with a black felt pen, and rubbed with a clean wiper, and the number of rubbing times at which the lines were erased was confirmed to measure the anti-pollution property.

<Measurement Standard>

○: The number of rubbing times at which the lines are erased is 10 or less

Δ: The number of rubbing times at which the lines are erased is 11 to 20

X: The number of rubbing times at which the lines are erased is greater than 20

3. Measurement of Scratch Resistance

While steel wool was loaded and allowed to go back and forth 10 times at 27 rpm, the surfaces of the anti-reflective films obtained in the examples and comparative examples were rubbed. The maximum load under which a scratch of 1 cm or less is observed as one or less with the unaided eye, was measured.

4. Measurement of Refractive Index

For the phase-separated regions of the low refractive layers obtained in the examples, refractive indexes at 550 nm were calculated using elliptic polarization at a wavelength of 380 nm to 1000 nm and using a Cauchy model.

Specifically, for each low refractive layer obtained in the examples, using an apparatus of J. A. Woollam Co. M-2000, a 70° incidence angle was applied and linear polarization was measured at a wavelength range of 380 to 1000 nm. The measured ellipsometry data (ψ,Δ) was fitted to a Cauchy model of the following Equation 1 for Layer 1 and Layer 2 of the low refractive layer such that MSE became 3 or less, using Complete EASE software.

$$n(\lambda) = A + \frac{B}{\lambda^2} + \frac{C}{\lambda^4} \qquad \text{[Equation 1]}$$

In Equation 1, n(λ) is a refractive index at a λ wavelength, λ is a range of 300 to 1800 nm, and A, B, and C are Cauchy parameters.

5. Measurement of Scattering Intensity According to Scattering Vector in Small Angle X-Ray Scattering To a specimen of 1 cm$^{-1}$ cm (width*length) obtained from each anti-reflective film of the examples and comparative examples, X-rays of a wavelength of 1.54 Å were irradiated at a distance of 4 m, thus measuring the scattering vector and scattering intensity.

Specifically, scattering intensity according to the scattering vector (q) was measured by transmitting X-rays through the specimen at a 4 C beam line of a Pohang Accelerator. More specifically, small angle scattering measurement was conducted by placing the specimen at a location about 4 m away from a detector and sending X-rays thereto, using X-rays with a vertical size of 0.023 mm and a horizontal size of 0.3 mm, and using 2D mar CCD as a detector. The scattered 2D diffraction pattern was obtained as an image, which was converted into scattering intensity according to the scattering vector (q) through calibration using a sample-to-detector distance obtained through a standard sample, and a circular average.

$$q=4\pi \sin \theta/\lambda \qquad \text{[Equation 1]}$$

In Equation 1, q is a scattering vector, θ is a ½ value of a scattering angle, and λ is the wavelength of irradiated X-rays.

Based on the above measurement results, a scattering vector value at which a first peak appears in a graph showing the log value of scattering intensity according to the scattering vector defined in small angle X-ray scattering, was calculated.

TABLE 2

| | Mean reflectance (%) | Scratch resistance (g) | Anti-pollution property | Whether or not phase separation occurs | $q_{max}$ (nm$^{-1}$) |
|---|---|---|---|---|---|
| Example 1 | 0.63 | 500 | ○ | ○ | 0.12 |
| Example 2 | 0.62 | 500 | ○ | ○ | 0.121 |
| Example 3 | 0.67 | 500 | ○ | ○ | 0.119 |
| Example 4 | 0.64 | 500 | ○ | ○ | 0.12 |
| Example 5 | 0.65 | 500 | ○ | ○ | 0.12 |
| Example 6 | 0.67 | 500 | ○ | ○ | 0.106 |
| Comparative Example 1 | 0.78 | 150 | X | X | 0.0739 |
| Comparative Example 2 | 0.8 | 200 | Δ | X | 0.127 |
| Comparative Example 3 | 0.75 | 200 | X | X | 0.0722 |

TABLE 3

| Refractive index | Example 1 | Example 2 | Example 3 | Example 4 | Example 5 | Example 6 |
|---|---|---|---|---|---|---|
| Region 1 | 1.502 | 1.505 | 1.498 | 1.491 | 1.511 | 1.505 |
| Region 2 | 1.35 | 1.349 | 1.321 | 1.346 | 1.211 | 1.375 |

As confirmed by Table 2 and FIGS. 10 to 15, the anti-reflective films of Examples 1 to 6 exhibit one or more peaks ($q_{max}$) at a scattering vector of 0.0758 to 0.1256 nm$^{-1}$, in a graph showing the log value of scattering intensity according to a scattering vector defined in small-angle X-ray scattering, and as shown in Table 2, the anti-reflective films of Examples 1 to 6 can simultaneously realize high scratch resistance and anti-pollution properties while exhibiting low reflectance of 0.70% or less in a visible light region.

As shown in FIGS. 1 to 6, it is confirmed that in the low refractive layer of the anti-reflective films of Examples 1 to 6, hollow inorganic nanoparticles and solid inorganic nanoparticles are phase separated, most of the solid inorganic nanoparticles exist near the interface between a hard coating layer of the anti-reflective film and the low refractive layer, and most of the hollow inorganic nanoparticles exist at locations far from the hard coating layer.

As shown in Table 3, it is confirmed that the first region and the second region that are distinguished by the phase separation of the hollow inorganic nanoparticles and the solid inorganic nanoparticles in the low refractive layer of the examples exhibit different ranges of refractive indexes, and specifically, the first region where solid inorganic nanoparticles are mainly distributed exhibits a refractive index of 1.420 or more, and the second region where hollow inorganic nanoparticles are mainly distributed exhibits a refractive index of 1.400 or less.

Figure 16:
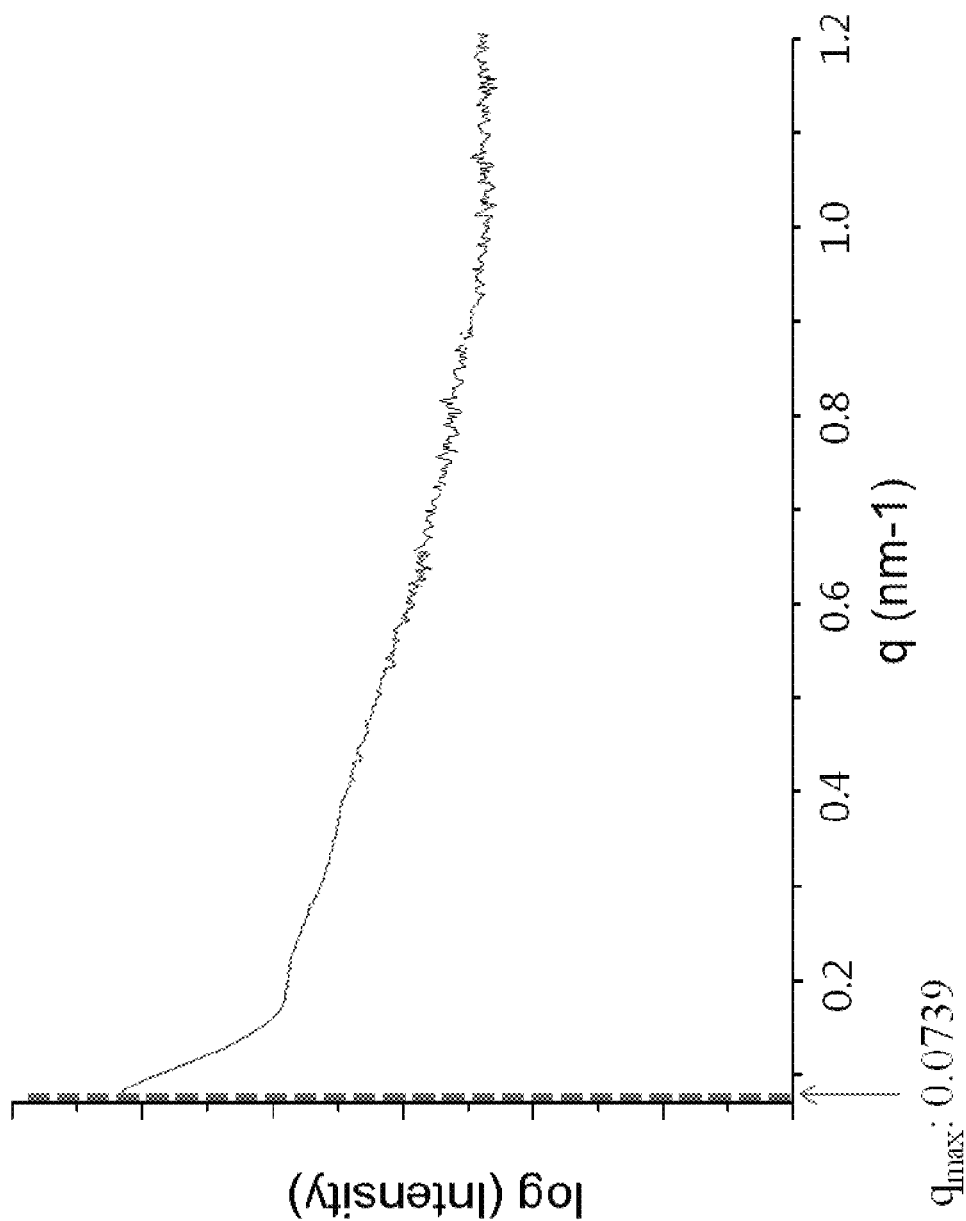
FIG. 16 is a graph showing the log value of scattering intensity to a scattering vector defined in small angle scattering obtained by X-ray irradiation of the anti-reflective film of Comparative Example 1.
Figure 17:
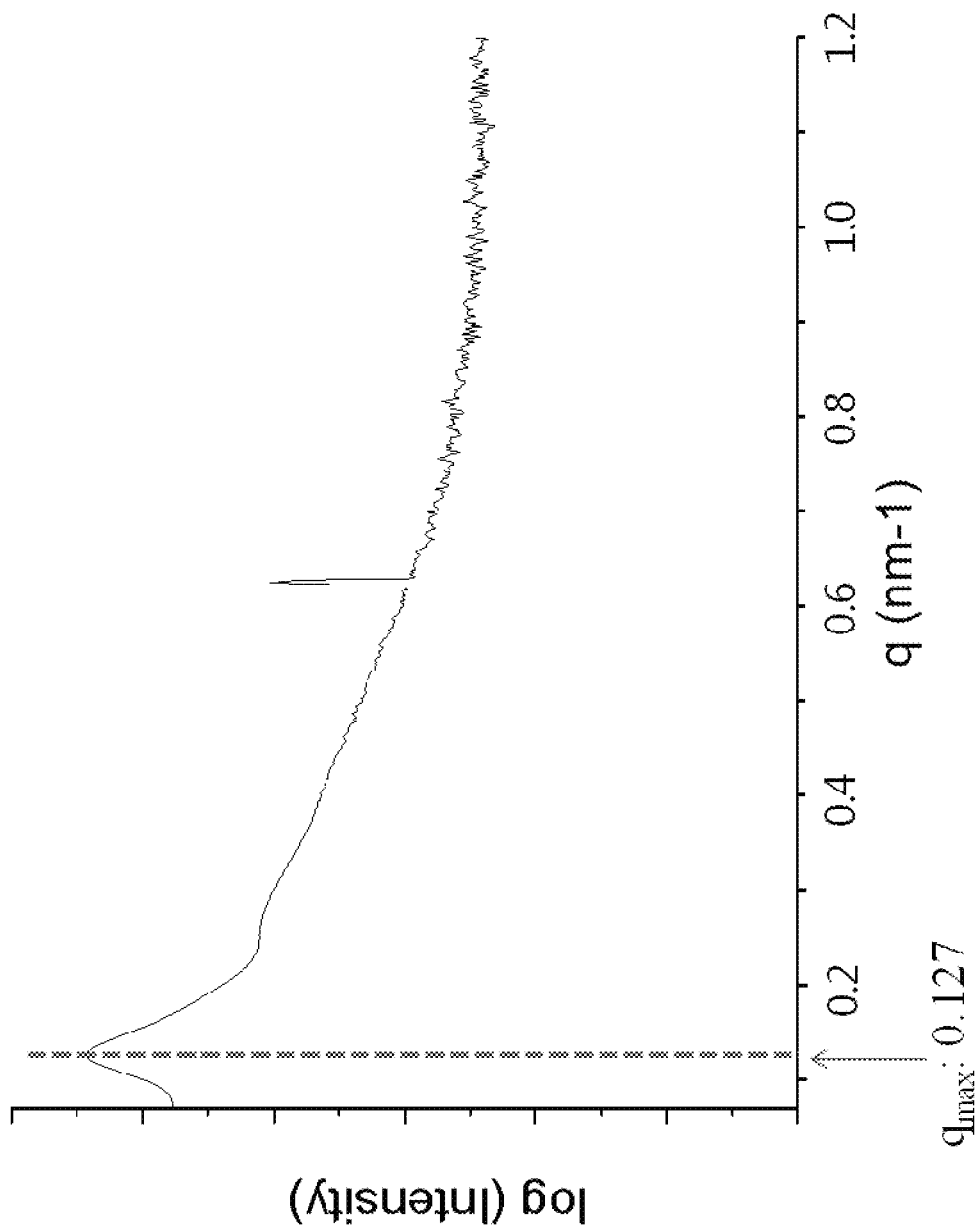
FIG. 17 is a graph showing the log value of scattering intensity to a scattering vector defined in small angle scattering obtained by X-ray irradiation of the anti-reflective film of Comparative Example 2.
Figure 18:
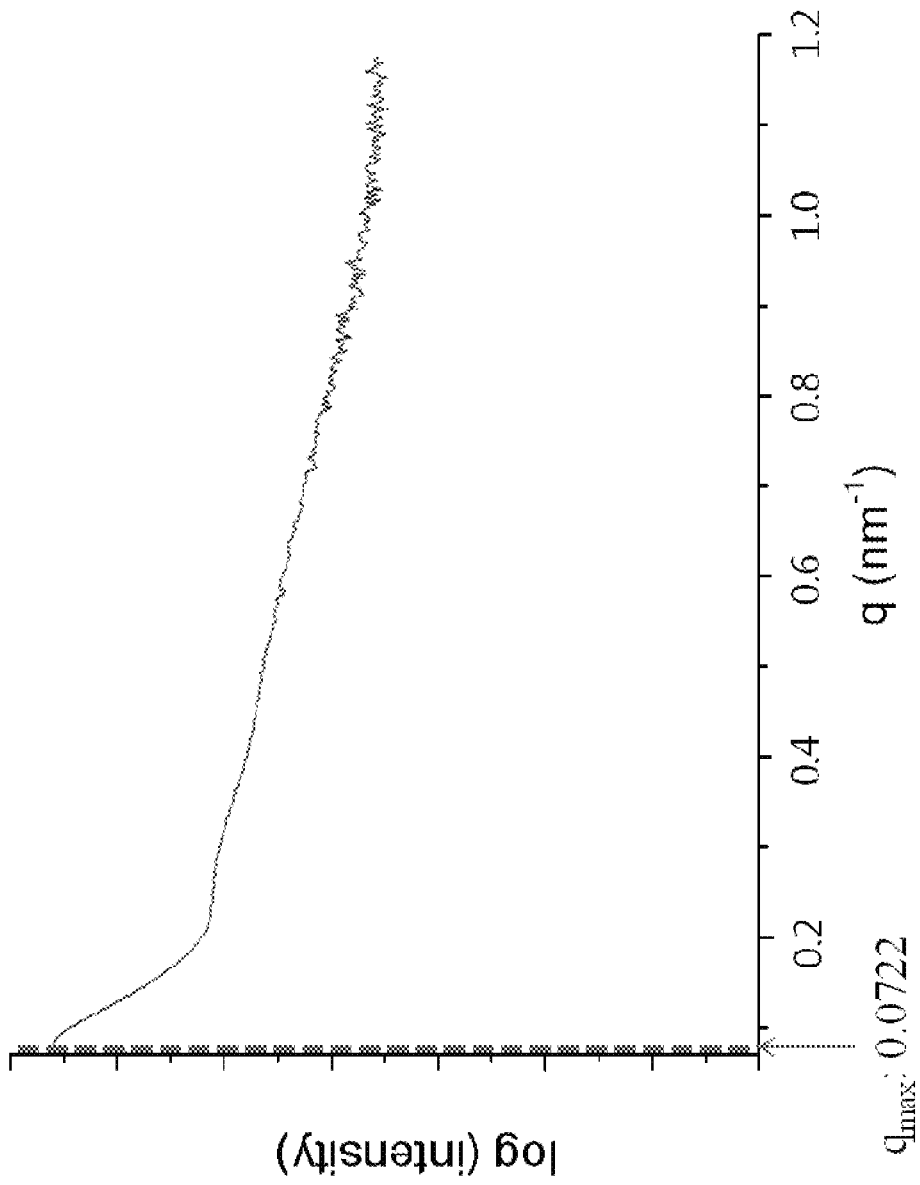
FIG. 18 is a graph showing the log value of scattering intensity to a scattering vector defined in small angle scattering obtained by X-ray irradiation of the anti-reflective film of Comparative Example 3.

To the contrary, as confirmed by Table 2 and FIGS. 16 to 18, in the graphs showing the log value of scattering intensity according to a scattering vector defined in small angle scattering by the X-ray irradiation of the anti-reflective films of Comparative Examples 1 to 3, a peak does not appear at a scattering vector range of 0.0758 to 0.1256 nm$^{-1}$, and such anti-reflective films of Comparative Examples 1 to 3 respectively exhibit low scratch resistance and an anti-pollution property as well as relatively high reflectance.

Figure 7:
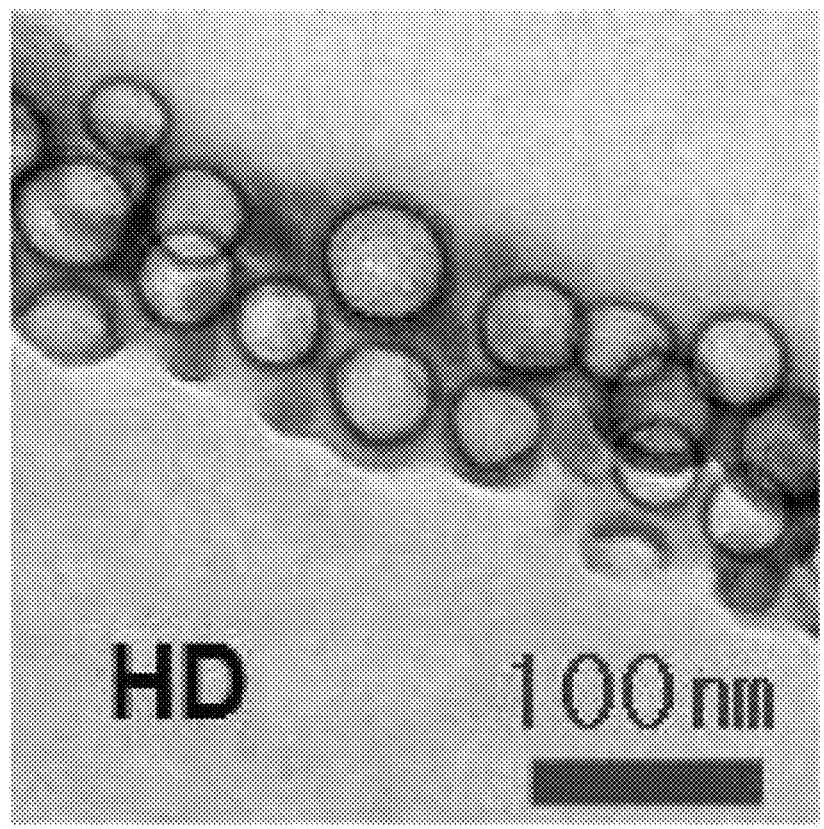
FIG. 7 shows the cross-sectional TEM image of the anti-reflective film of Comparative Example 1.
Figure 8:
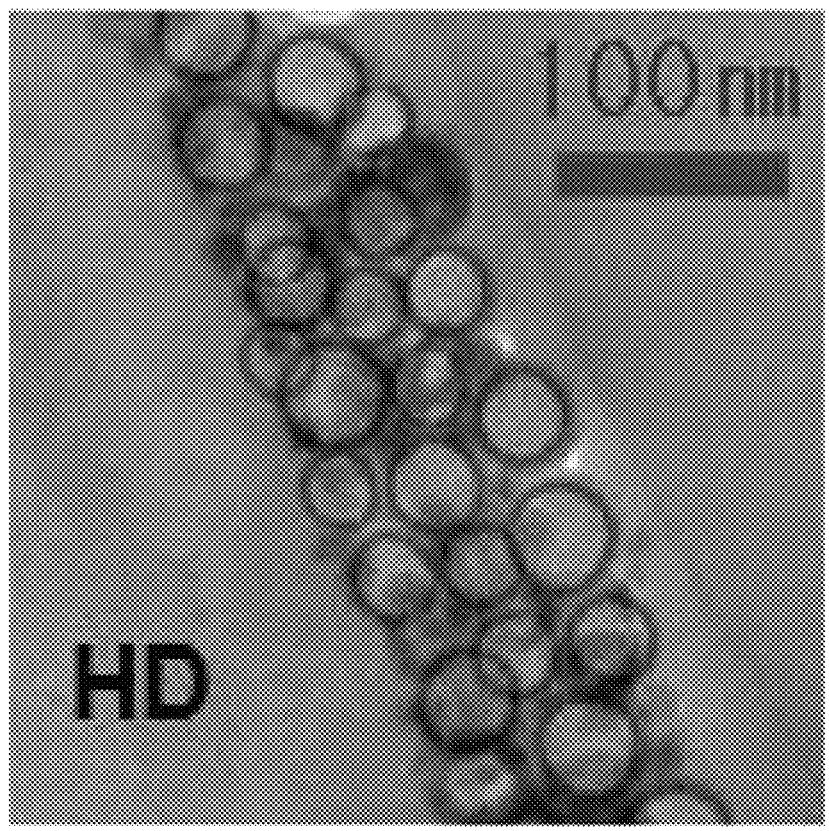
FIG. 8 shows the cross-sectional TEM image of the anti-reflective film of Comparative Example 2.
Figure 9:
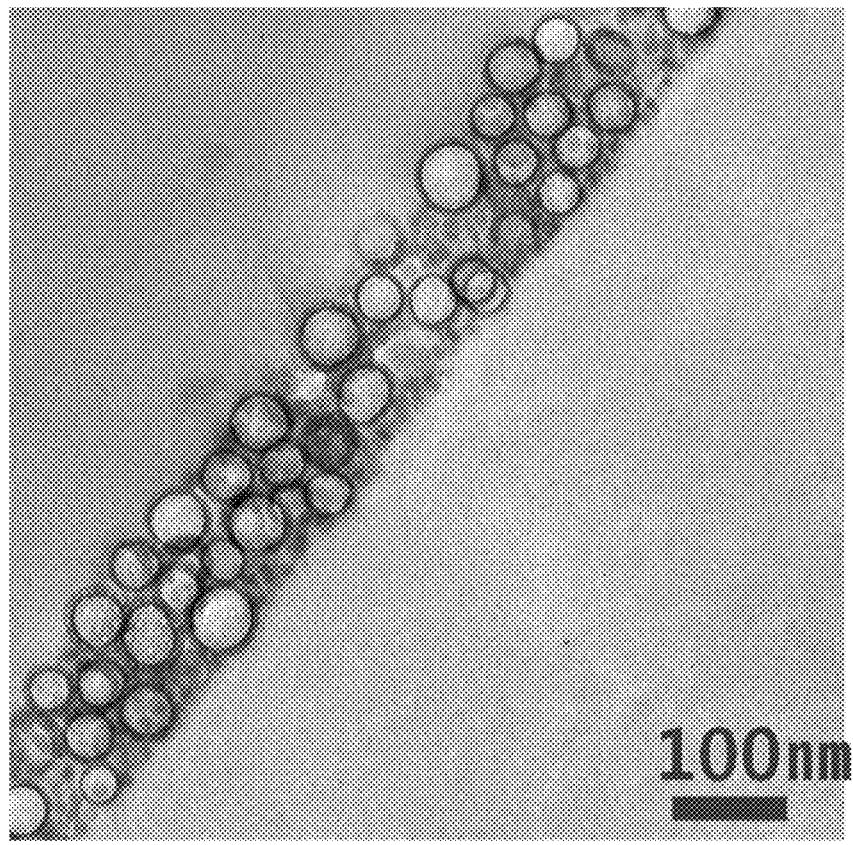
FIG. 9 shows the cross-sectional TEM image of the anti-reflective film of Comparative Example 3.
Figure 10:
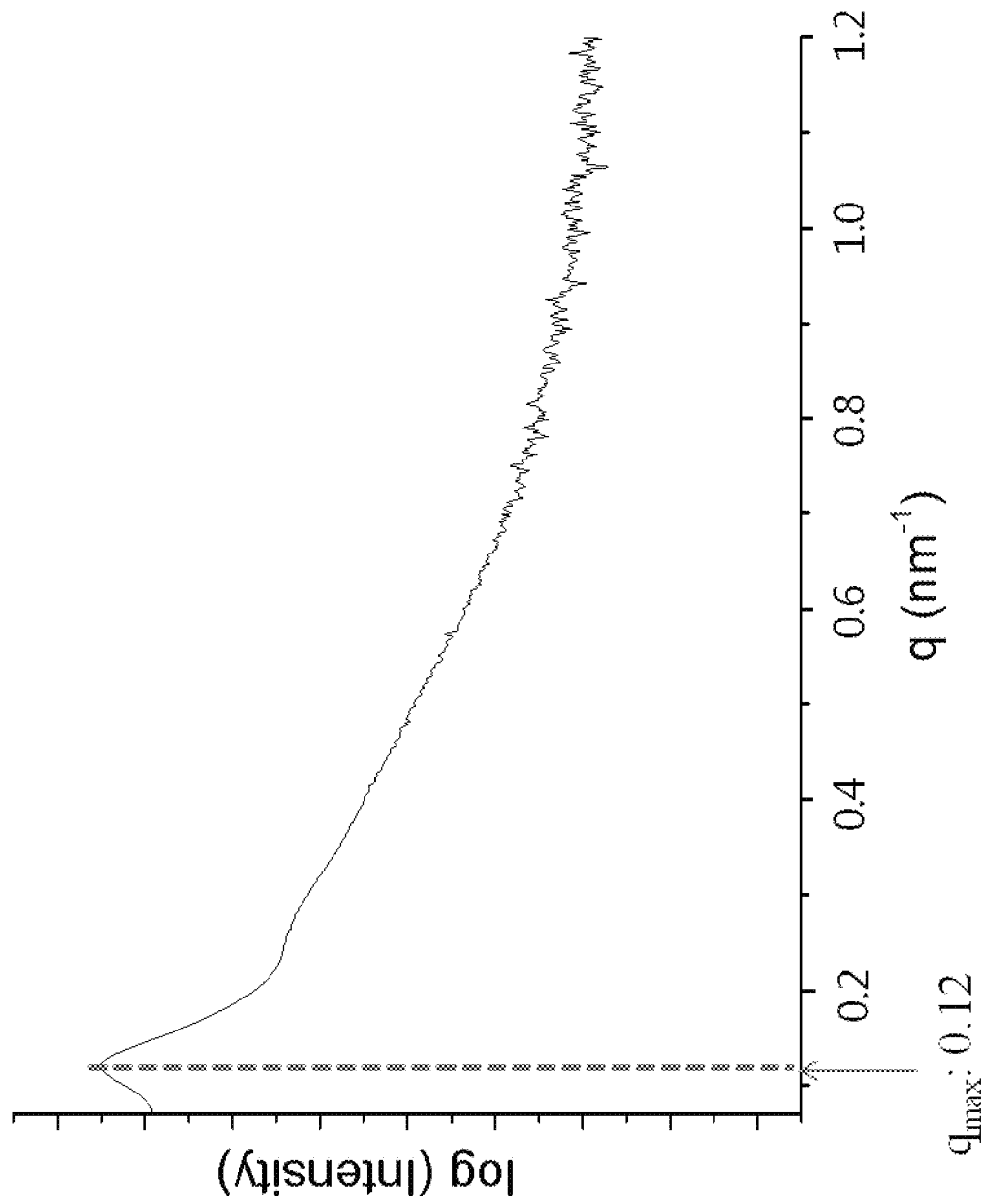
FIG. 10 is a graph showing the log value of scattering intensity to a scattering vector defined in small angle scattering obtained by X-ray irradiation of the anti-reflective film of Example 1.
Figure 11:
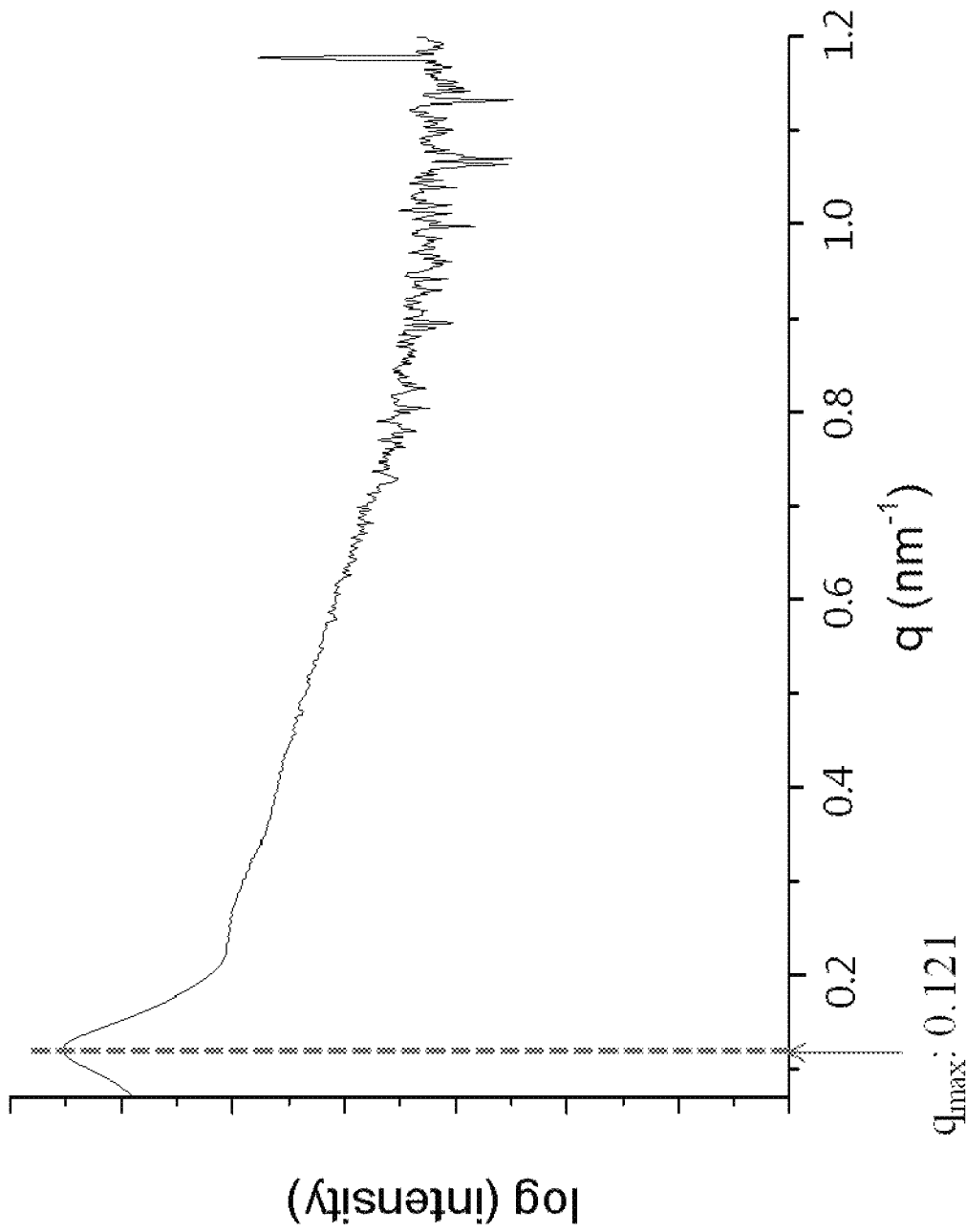
FIG. 11 is a graph showing the log value of scattering intensity to a scattering vector defined in small angle scattering obtained by X-ray irradiation of the anti-reflective film of Example 2.
Figure 12:
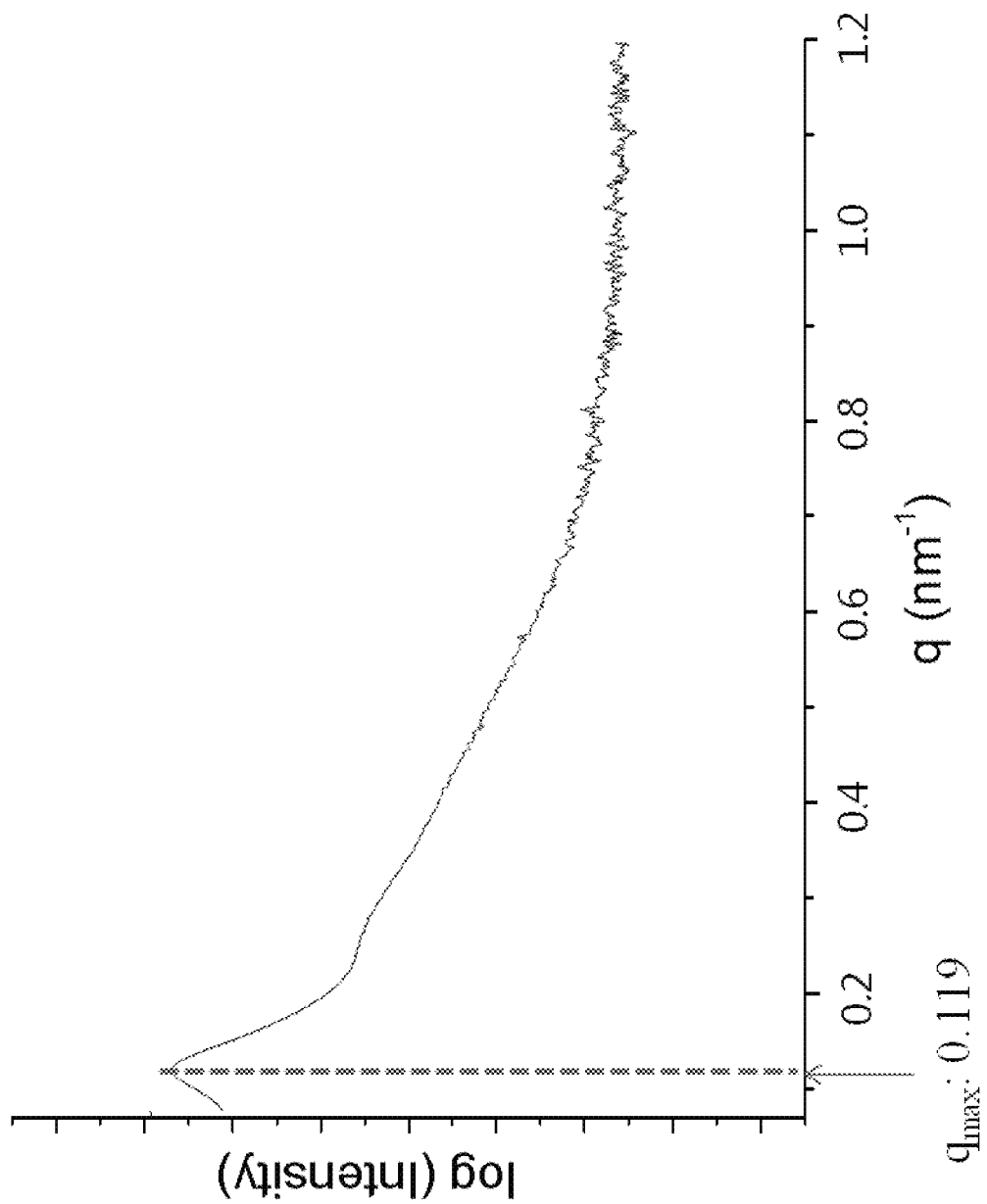
FIG. 12 is a graph showing the log value of scattering intensity to a scattering vector defined in small angle scattering obtained by X-ray irradiation of the anti-reflective film of Example 3.
Figure 13:
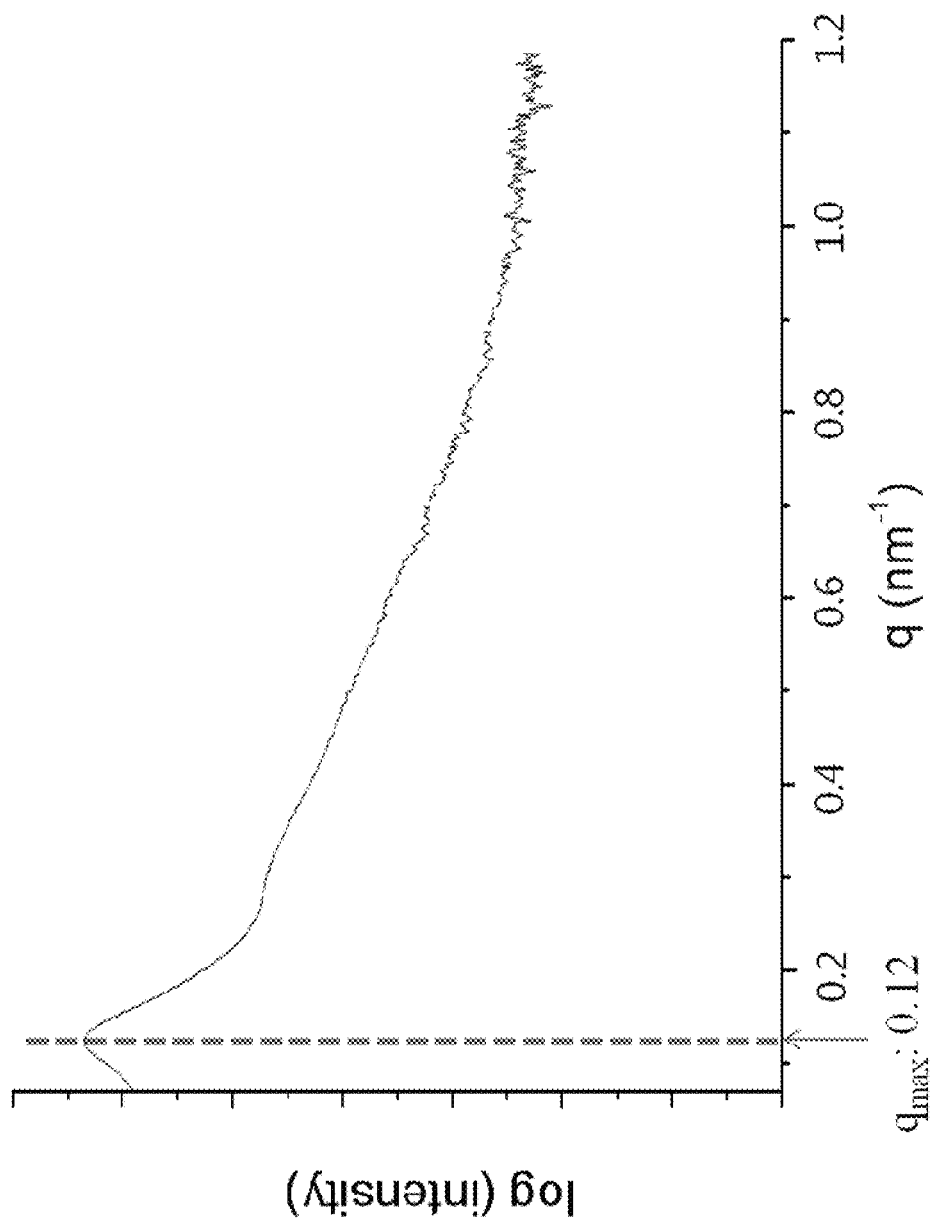
FIG. 13 is a graph showing the log value of scattering intensity to a scattering vector defined in small angle scattering obtained by X-ray irradiation of the anti-reflective film of Example 4.
Figure 14:
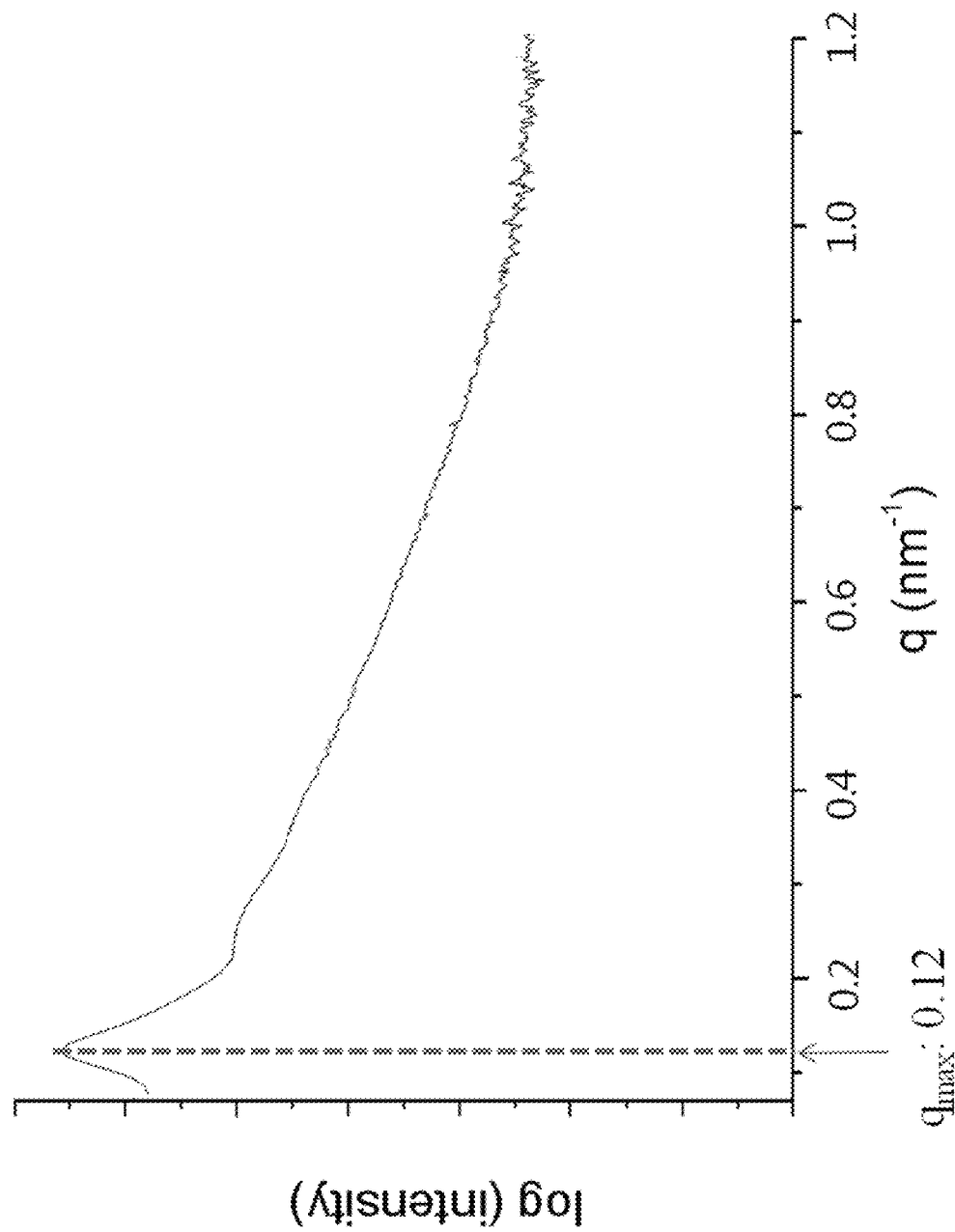
FIG. 14 is a graph showing the log value of scattering intensity to a scattering vector defined in small angle scattering obtained by X-ray irradiation of the anti-reflective film of Example 5.
Figure 15:
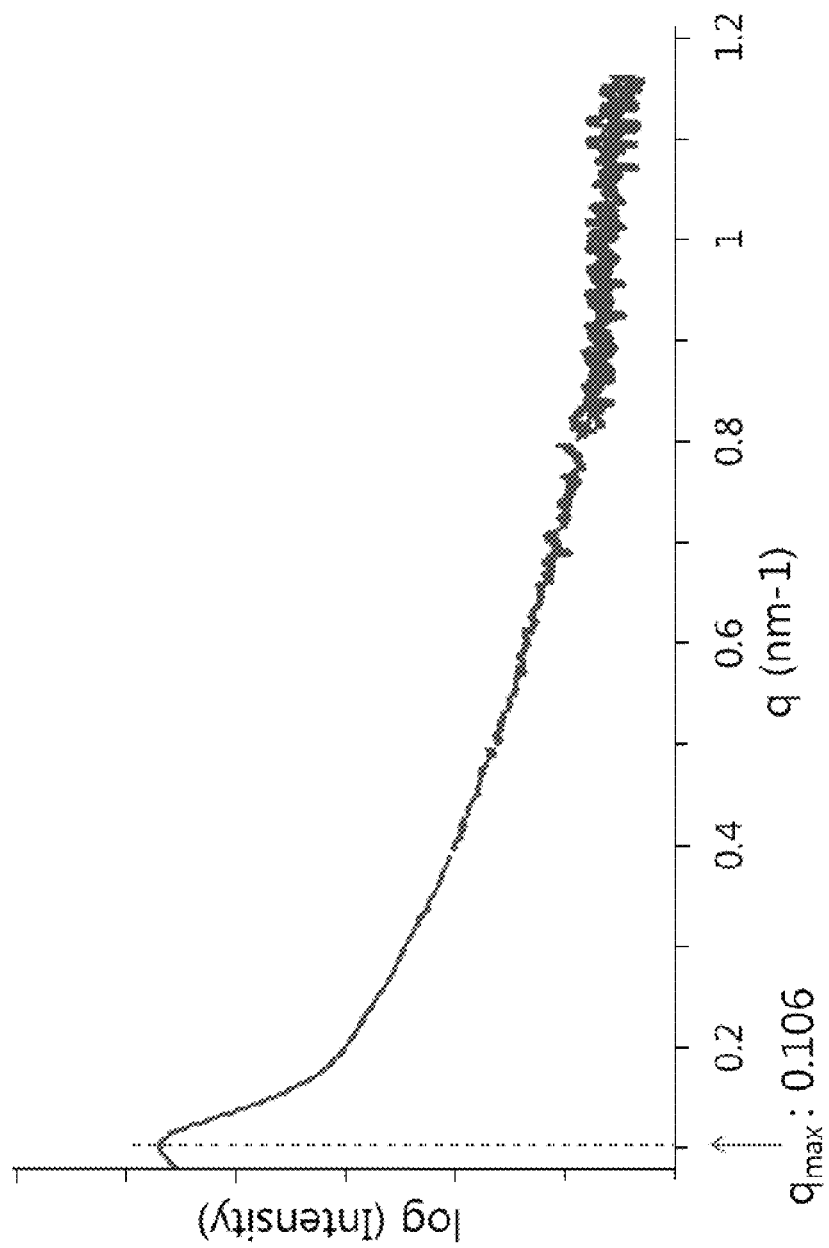
FIG. 15 is a graph showing the log value of scattering intensity to a scattering vector defined in small angle scattering obtained by X-ray irradiation of the anti-reflective film of Example 6.

Further, as shown in FIGS. 7 and 9, it is confirmed that in the low refractive layers of the anti-reflective films of Comparative Examples 1 to 3, hollow inorganic nanoparticles and solid inorganic nanoparticles mixedly exist without phase separation.

What is claimed is:

1. An anti-reflective film exhibiting one or more peaks ($q_{max}$) at a scattering vector of 0.0758 nm$^{-1}$ or more, in a graph showing a log value of scattering intensity to a scattering vector defined in small-angle X-ray scattering,
   wherein the small-angle X-ray scattering is measured by irradiating X-rays of a wavelength of 0.63 to 1.54 Å to an anti-reflective film with a size of 1 cm*1 cm (width*length) at a distance of 4 m;
   wherein the scattering vector is defined as in the following Equation 1:

$$q=4\pi \sin \theta/\lambda \qquad \text{[Equation 1]}$$

wherein, in Equation 1, q is a scattering vector, θ is a ½ value of a scattering angle, and λ is a wavelength of irradiated X-rays,
   wherein the anti-reflective film comprises a hard coating layer and a low refractive index layer disposed on the hard coating layer, the low refractive index layer comprising a binder resin, and hollow inorganic nanoparticles and solid inorganic nanoparticles dispersed in the binder resin,
   wherein the low refractive index layer comprises a first layer comprising 70 vol % or more of the total volume of the solid inorganic nanoparticles and a second layer comprising 70 vol % or more of the total volume of the hollow inorganic nanoparticles, wherein the anti-reflective film comprising an interface between the hard coating layer and the low refractive index layer, wherein the first layer and the second layer are sequentially laminated from the interface, wherein the second layer is in contact with the first layer, wherein the interface between the first layer and the second layer comprises the solid inorganic nanoparticles and the hollow inorganic nanoparticles, wherein the second layer has polarization ellipticity measured by ellipsometry using a Cauchy model represented by the following General Formula 1 in which A is 1.0 to 1.50, B is 0 to 0.007, and C is 0 to $1*10^{-3}$:

$$n(\lambda) = A + \frac{B}{\lambda^2} + \frac{C}{\lambda^4} \qquad \text{[General Formula 1]}$$

in the General Formula 1, n(λ) is a refractive index at a wavelength λ, λ is in a range of 300 nm to 1800 nm, and A, B, and C are Cauchy parameters.

2. The anti-reflective film according to claim 1, wherein the anti-reflective film exhibits mean reflectance of 1.5% or less in a visible light wavelength region of 380 to 780 nm.

3. The anti-reflective film according to claim 1, wherein the solid inorganic nanoparticles have a density of 2.00 g/cm to 4.00 g/cm, and the hollow inorganic nanoparticles have a density of 1.50 g/cm to 3.50 g/cm.

4. The anti-reflective film according to claim 1, wherein the first layer has polarization ellipticity measured by ellipsometry using a Cauchy model of the General Formula 1 in which A is 1.0 to 1.65, B is 0.0010 to 0.0350, and C is 0 to $1*10^{-3}$.

5. The anti-reflective film according to claim 1, wherein the first layer has a refractive index of 1.420 to 1.600 at 550 nm, and the second layer has a refractive index of 1.200 to 1.410 at 550 nm.

6. The anti-reflective film according to claim 1, wherein the first layer has a thickness of 1 nm to 50 nm, and the second layer has a thickness of 5 nm to 300 nm.

7. The anti-reflective film according to claim 6, wherein the solid inorganic nanoparticles have a diameter of 0.5 to 100 nm, and the hollow inorganic nanoparticles have a diameter of 1 to 200 nm.

8. The anti-reflective film according to claim 1, wherein the solid inorganic nanoparticles have a density at least 0.50 g/cm greater than density of the hollow inorganic nanoparticles.

9. The anti-reflective film according to claim 1, wherein the solid inorganic nanoparticles and the hollow inorganic nanoparticles respectively contain one or more reactive functional groups selected from the group consisting of a (meth)acrylate group, an epoxide group, a vinyl group, and a thiol group on the surface thereof.

10. The anti-reflective film according to claim 1, wherein the binder resin included in the low refractive index layer comprises a (co)polymer of photopolymerizable compounds and a cross-linked (co)polymer of fluorine-containing compounds comprising photoreactive functional groups.

11. The anti-reflective film according to claim 10, wherein the low refractive index layer comprises, based on 100 parts by weight of the (co)polymer of photopolymerizable compounds, 10 to 400 parts by weight of the hollow inorganic nanoparticles and 10 to 400 parts by weight of the solid inorganic nanoparticles.

12. The anti-reflective film according to claim 10, wherein the fluorine-containing compounds comprising photoreactive functional groups respectively have a weight average molecular weight of 2000 to 200,000.

13. The anti-reflective film according to claim 10, wherein the binder resin comprises, based on 100 parts by weight of the (co)polymer of photopolymerizable compounds, 20 to 300 parts by weight of the fluorine-containing compounds comprising photoreactive functional groups.

14. The anti-reflective film according to claim 1, wherein the hard coating layer comprises a binder resin comprising a photocurable resin, and organic or inorganic fine particles dispersed in the binder resin.

15. The anti-reflective film according to claim 14, wherein the organic fine particles have a particle diameter of 1 to 10 μm, and the inorganic particles have a particle diameter of 1 to 500 nm.

16. The anti-reflective film according to claim 1, exhibiting one or more peaks ($q_{max}$) at a scattering vector of 0.0758 to 0.1256 $nm^{-1}$, in a graph showing a log value of scattering intensity to a scattering vector defined in small-angle X-ray scattering.

* * * * *